(12) United States Patent
Cheng et al.

(10) Patent No.: US 9,115,263 B2
(45) Date of Patent: Aug. 25, 2015

(54) COMPOSITE MATERIALS AND METHOD FOR MAKING HIGH-PERFORMANCE CARBON NANOTUBE REINFORCED POLYMER COMPOSITES

(71) Applicant: Florida State University Research Foundation, Inc., Tallahassee, FL (US)

(72) Inventors: Qunfeng Cheng, Beijing (CN); Richard Liang, Tallahassee, FL (US); Ben Wang, Atlanta, GA (US); Chun Zhang, Marietta, GA (US); Jianwen Bao, Beijing (CN)

(73) Assignee: FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 74 days.

(21) Appl. No.: 13/856,105

(22) Filed: Apr. 3, 2013

(65) Prior Publication Data
US 2013/0264521 A1     Oct. 10, 2013

Related U.S. Application Data

(62) Division of application No. 13/090,576, filed on Apr. 20, 2011, now Pat. No. 8,916,651.

(60) Provisional application No. 61/326,011, filed on Apr. 20, 2010.

(51) Int. Cl.
| | |
|---|---|
| *C08K 9/04* | (2006.01) |
| *C08K 3/04* | (2006.01) |
| *B82Y 30/00* | (2011.01) |
| *C08F 122/40* | (2006.01) |
| *C08L 63/00* | (2006.01) |

(52) U.S. Cl.
CPC . *C08K 9/04* (2013.01); *B82Y 30/00* (2013.01); *C08F 122/40* (2013.01); *C08K 3/04* (2013.01); *C08L 63/00* (2013.01); *C01B 2202/08* (2013.01); *Y10S 977/783* (2013.01)

(58) Field of Classification Search
None
See application file for complete search history.

(56) References Cited

U.S. PATENT DOCUMENTS

| | | | |
|---|---|---|---|
| 4,562,033 | A | 12/1985 | Johnson et al. |
| 6,036,857 | A | 3/2000 | Chen et al. |
| 6,436,221 | B1 | 8/2002 | Chang et al. |
| 6,569,937 | B2 | 5/2003 | Foulger et al. |
| 6,683,783 | B1 | 1/2004 | Smalley et al. |
| 6,723,299 | B1 | 4/2004 | Chen et al. |
| 6,741,019 | B1 | 5/2004 | Filas et al. |
| 7,105,596 | B2 | 9/2006 | Smalley et al. |
| 7,244,407 | B2 | 7/2007 | Chen et al. |
| 7,459,121 | B2 | 12/2008 | Liang et al. |
| 7,641,829 | B2 | 1/2010 | Liang et al. |
| 7,862,766 | B2 | 1/2011 | Liang et al. |
| 2001/0051272 | A1 | 12/2001 | Toyoda et al. |
| 2002/0094125 | A1 | 7/2002 | Smalley et al. |
| 2002/0098135 | A1 | 7/2002 | Smalley et al. |
| 2003/0146529 | A1 | 8/2003 | Chen et al. |
| 2004/0065969 | A1 | 4/2004 | Chatterjee et al. |
| 2004/0101634 | A1 | 5/2004 | Park et al. |
| 2005/0154116 | A1 | 7/2005 | Nagy et al. |
| 2005/0239948 | A1 | 10/2005 | Haik et al. |
| 2006/0017191 | A1 | 1/2006 | Liang et al. |
| 2006/0166003 | A1 | 7/2006 | Khabashesku et al. |
| 2006/0217482 | A1 | 9/2006 | Lukehart et al. |
| 2007/0176319 | A1 | 8/2007 | Thostenson et al. |
| 2008/0057265 | A1 | 3/2008 | Liang et al. |
| 2008/0225464 | A1 | 9/2008 | Lashmore |
| 2008/0280115 | A1 | 11/2008 | Liang et al. |
| 2009/0075545 | A1 | 3/2009 | Lashmore et al. |
| 2009/0280324 | A1 | 11/2009 | Liang et al. |
| 2010/0227155 | A1* | 9/2010 | Bao et al. ............... 428/323 |
| 2011/0045274 | A1* | 2/2011 | Bao et al. ............... 428/297.4 |

FOREIGN PATENT DOCUMENTS

| | | |
|---|---|---|
| WO | 0130694 | 5/2001 |
| WO | 2007029934 | 3/2007 |

OTHER PUBLICATIONS

Fisher, Journal of Applied Physics, vol. 9i3, No. 4, Feb. 2003, p. 2157-2163.
Cheng, J. Mater. Res., vol. 23, No. 11, Nov. 2008, p. 2975-2983.
Ma, Carbon, 46 (2008) 706-720.
Ajayan, et al., "Aligned Carbon Nanotube Arrays Formed by Cutting a Polymer Resin-Nanotube Composite," Science, vol. 265, pp. 1212-1214 (1994).
Ajayan, et all, "Single-Walled Carbon Nanotube-Polymer Composites: Strength and Weakness," Advanced Materials 12:750-753 (2000).
Ajayan, Pulickel M. et al. "Nanotube Composites," Nature vol. 447, pp. 1066-1068 (2007).
Andrews, et al., "Nanotube composite carbon fibers," Applied Physics Letters, 75(9): pp. 1329-1331 (1999).
Atkinson, Ken, et al. "Multifunctional carbon nanotube yarns by downsizing an ancient technology," Science 306, pp. 1358-1361 (2004).
Chattopadhyay, Jayanta, et al., "SET Mechanism in the Functionalization of Single-Walled Carbon Nanotubes," J. Phys. Chem. C, 111, 17928-17932 (2007).
Chauvet, et al., "Magnetic anisotropies of aligned carbon nanotubes," The American Physical Society, 52(10): pp. 6963-6966 (1995).
Chen, et al., "Electrochemical synthesis of polypyrrole/carbon nanotube nanoscale composites using well-aligned carbon nanotube arrays," Applied Physics A, vol. 73, pp. 129-131 (2001).

(Continued)

*Primary Examiner* — Robert C Boyle
(74) *Attorney, Agent, or Firm* — Sutherland Asbill & Brennan LLP

(57) ABSTRACT

Nanocomposite materials and methods of making composite materials reinforced with carbon nanotubes are disclosed. The composite material includes an array of functionalized and aligned carbon nanotubes having a degree of functionalization of about 1% to about 10%; and a polymeric matrix material bonded to the array of functionalized and aligned carbon nanotubes.

15 Claims, 18 Drawing Sheets

(56) References Cited

OTHER PUBLICATIONS

Cheng, Qunfeng, et al. "High mechanical performance composite conductor: multi-walled carbon nanotube sheet/bismaleimide nanocomposites," Adv. Funct. Mat. 19, pp. 3219-3225 (2009).

Wang, et al., "Growth and characterization of buckybundles," Applied Physics Letters, 62(16), pp. 1881-1883 (1993).

Cho, et al., "Carbon nanotube synthesis using a magnetic field via thermal chemical vapor deposition," Journal of Crystal Growth 243, pp. 224-229 (2002).

Cooper, et al., "Distribution and Alignment of Carbon Nanotubes and Nanofibrils in a Polymer Matrix," Composites Science and Technology 62:1105-1112 (2002).

Dai, "Carbon Nanotubes Opportunities and Challenges," Surface Science 500, pp. 218-241 (2002).

de Heer, et al., "Aligned Carbon Nanotube Films: Production and Optical and Electronic Properties," Science 268:845-847 (1995).

Dresselhaus, et al., "Synthesis of Graphite Fibers and Filaments," M. Cardon, Ed., pp. 12-34 (1988).

Durgun, E., et al., "Systematic study of adsorption of single atoms on a carbon nanotube," Physical Review B 67, 201401R 2003, pp. 1-4.

Endo, et al., "Buckypaper from Coaxial Nanotubes," Nature, vol. 433, Feb. 3, 2005, p. 476.

Ericson, L. M. et al. "Macroscopic, neat, single-walled carbon nanotube fibers," Science, 305, pp. 1447-1450 (2004).

Fan, et al., "Self-Oriented Regular Arrays of Carbon Nanotubes and Their Field Emission Properties," Science 283:512-514 (1999).

Fugiwara, et al., "Magnetic Orientation and Magnetic Properties of a Single Carbon Nanotube," The Journal of Physical Chemistry, 105(18): pp. 4383-4386 (2001).

Garg, et al., "Effect of chemical functionalization on the mechanical properties of carbon nanotubes," Chemical Physics Letters, 295(4): pp. 273-278 (1998). Abstract.

Gou, et al., "Experimental Design and Optimization of Dispersion Process for Single-Walled Carbon Nanotube Bucky Paper," International Journal of Nanoscience, 3(3), pp. 293-307 (2004).

Gou, et al., "Development of Nanotube Bucky Paper/Epoxy Nanocomposites," Proceedings of the TEXCOMP-6 International Symposium on textile Composites, Sep. 11-13, pp. 1-5 (2002).

Gou, et al., "Process Analysis and Optimization of SWNT Bucky Paper Reinforce Epoxy Composites," Proceedings of the 48th International Society for Advancement of Material Process Engineering (SAMPE) Symposium and Exhibition, Long Beach, CA, May 12-14, pp. 1-12 (2003).

Gu, A.J. et al. "Bismaleimide/carbon nanotube hybrids for potential aerospace application: I. Static and dynamic mechanical properties," Polymers for Advanced Technologies, vol. 18, Issue 10, pp. 835-840 (2007).

Haggenmueller, et al., "Aligned single-wall carbon nanotubes in composites by melt processing methods," Chemical Physics Letters 330, Nov. 10, 2000, pp. 219-225.

Hertel, et al., "Deformation of Carbon Nanotubes by Surface van der Waals Forces," Physical Review B. 58:13870-13873 (1998).

Holloway, et al., "Texture Development Due to Preferential Grain Growth of Ho—Ba—Cu—O in 1.6-T Magnetic Field," J. Mat. Res. 8:727-733 (1993).

Jiang, K. et al. "Nanotechnology: spinning continuous carbon nanotube yarns," Nature, vol. 419, p. 801 (2002).

Kimura, et al., "Polymer Composites of Carbon Nanotubes Aligned by a Magnetic Field," Advanced Materials, vol. 14, No. 19, Oct. 2, 2002, pp. 1380-1383.

Knez, et al., "Electrochemical modification of individual nano-objects," Journal of Electroanalytical Chemistry, vol. 522: pp. 70-74 (2002).

Kumar, et al., "Fibers from Polypropylene/Nano Carbon Fiber Composites," polymer 43:1701-1703 (2002).

Kyotani, et al., "Preparation of Ultrafine Carbon Tubes in Nanochannels of an Anodic Aluminum Oxide Film," Chem. Mater. 8:2109-2113 (1996).

Li, et al., "Large-Scale Synthesis of Aligned Carbon Nanotubes," Science 274:1701-1703 (1996).

Li, Yan-Hui, et al., "Adsoprtion of cadmium(II) from aqueous solution by surface oxidized carbon nanotubes," Carbon 41, pp. 1057-1062 (2003).

Liang, et al., Molecular Dynamic Simulation and Experimental Investigation of Filling Chopped SWNTS with Resin Matrix Molecules to Enhance Interfacial Bonding and Loading Transfer in Nanocomposites, SAMPE 2004, Long Beach, CA , May 16-24, pp. 1-8 (2004).

Lourie, et al., "Evaluation of Young's modulus of carbon nanotubes by micro-Raman spectroscopy," Journal of Materials Research, 13(9), pp. 2418-2422 (1998).

Ni, et al., "Chemical Functionalization of Carbon Nanotubes through Energetic Radical Collisions," Physical Review B. 61:R16343-R16346 (2000).

Niyogi, S. et al. "Chemistry of the single-walled carbon nanotubes," Acc. Chem. Res., 35(12), pp. 1105-1113 (2002).

Ogrin, D. et al. "Epoxidation and Deoxygenation of Single-Walled Carbon Nanotubes: Quantification of Epoxide Defects," J. Am. Chem. Soc., 128(35), pp. 11322-11323 (2006).

Qian, et al., "Load transfer and deformation mechanism in carbon nanotube-polystyrene composites," Applied Physics Letters, 76(20), pp. 2868-2870 (2000).

Raymundo-Piñero, et al., "High surface area carbon nanotubes prepared by chemical activation," Carbon 40, pp. 1597-1617 (2002).

Smith, et al., "Structural anisotropy of magnetically aligned single wall carbon nanotube films," Applied Physics Letters 77(5), pp. 663-665 (2000).

Stéphan, et al., "Characterization of singlewalled carbon nanotubes-PMMA composites," Synthetic Metals, 108(2), pp. 139-149 (2000). Abstract.

Strano, M.S. et al. "Electronic structure control of single-walled carbon nanotube functionalization," Science, vol. 301, p. 1519 (2003).

Thostenson, et al., "Advances in the science and technology of carbon nanotubes and their composites: a review," Composites Science and Technology 61, pp. 1899-1912 (2001).

Thostenson, et al., "Nanocomposites in context," Composites Science and Technology 65:491-516 (2005).

Treacy, et al., "Exceptionally High Young's Modulus Observed for Individual Carbon Nanotubes," Nature 381:678-680 (1996).

Velasco-Santos, et al., "Chemical functionalization of carbon nanotubes through an organosilane," Nanotechnology, vol. 13, pp. 495-498 (2002). Abstract.

\* cited by examiner

COMPOSITE MATERIALS AND METHOD FOR MAKING HIGH-PERFORMANCE CARBON NANOTUBE REINFORCED POLYMER COMPOSITES

CROSS-REFERENCE TO RELATED APPLICATIONS

The present application is a divisional application of U.S. patent application Ser. No. 13/090,576, filed Apr. 20, 2011, which claims priority to U.S. Provisional Application No. 61/326,011, filed Apr. 20, 2010. U.S. patent application Ser. No. 13/090,576 and U.S. Provisional Patent Application No. 61/326,011 are incorporated herein by reference.

STATEMENT REGARDING FEDERALLY SPONSORED RESEARCH OR DEVELOPMENT

This invention was made with government support under grant number NOOOI4-08-M-0348 awarded by the Office of Naval Research and grant number FA9550-05-1-0271 awarded by the Air Force Office of Scientific Research. The government has certain rights to this invention.

BACKGROUND

Carbon nanotubes (CNTs) possess many beneficial properties, such as exceptionally high strength and modulus, large elastic strain, and fracture strain sustaining capability, which are not available in the previous materials. Carbon nanotubes are the strongest fibers that are currently known. The Young's Modulus of single-walled carbon nanotubes is around 1 TPa, which is 5 times greater than steel (200 GPa) while the density is only 1.2-1.4 g/cm$^3$. The tensile strength of single-walled carbon nanotubes falls in the range of 50-200 GPa. Theoretically, materials made of carbon nanotubes may be made lighter and stronger than that of state-of-the-art high-performance carbon fiber reinforced polymer composites, and would therefore be useful in structural and other applications.

Despite the tremendous potential of CNT materials, however, current CNT materials have been unable to fully realize the high-performance potential of CNTs composites. Some of the obstacles to realizing the high performance potential of CNTs composites include: (1) low CNT concentration; (2) poor CNT dispersion; (3) lack of CNT orientation; (4) weak interfacial bonding between CNT and matrix; and (5) short length of CNT (usually 1-100 μm) and limited aspect ratio for load transfer. New methods and materials are therefore needed to overcome these deficiencies and more successfully exploit the useful properties of CNTs.

SUMMARY

In one aspect, a composite material is provided. The composite material includes an array of functionalized and aligned carbon nanotubes having a degree of functionalization of about 1% to about 10%. The composite material also includes a polymeric matrix material bonded to the array of functionalized and aligned carbon nanotubes.

In another aspect, a method is provided for making a composite material. The method includes functionalizing a sheet of carbon nanotubes to produce a sheet of functionalized carbon nanotubes having a degree of functionalization between about 1% to about 10%; aligning the carbon nanotubes; and, thereafter impregnating the sheet of functionalized and aligned carbon nanotubes with a matrix material and allowing the sheet of functionalized and aligned carbon nanotubes to bond with the matrix material.

DETAILED DESCRIPTION

Figure 1:
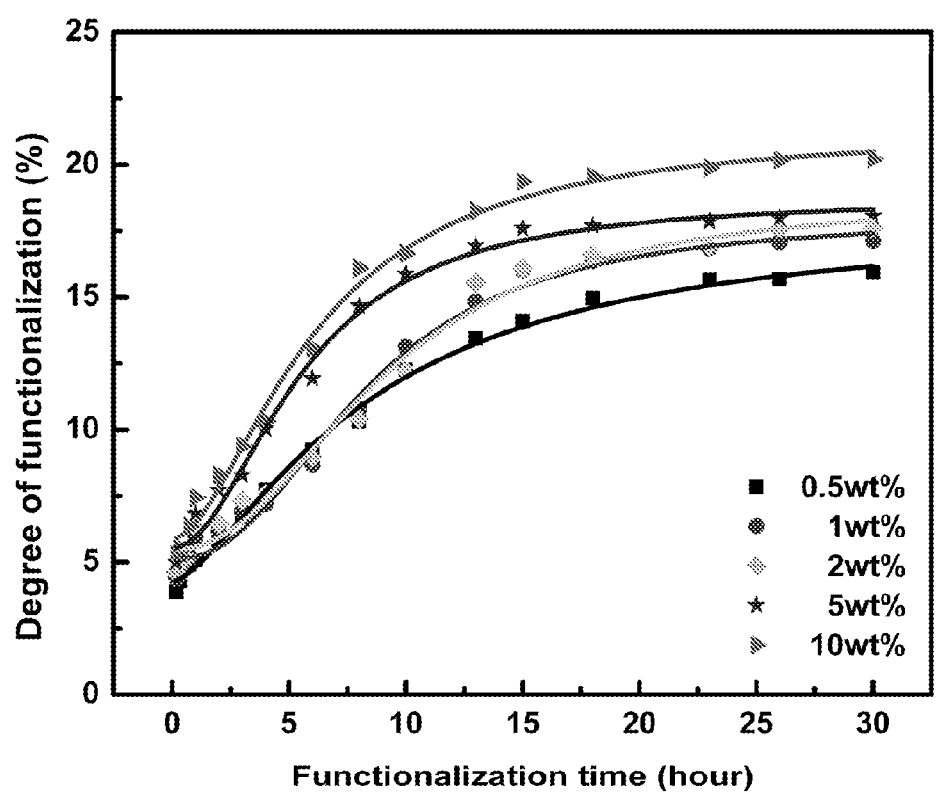
FIG. 1 depicts degree of functionalization versus reaction time with m-chloroperoxybenzoic acid (m-CPBA) solutions of different concentrations.

Described herein are new carbon nanotube (CNT) composite materials and methods of producing CNT composite materials having exceptionally high performance characteristics. The materials and methods disclosed herein may be used in the mass production of high-performance nanotube-reinforced thermosetting composites. The improvements disclosed herein are based in part on the methods and materials described in U.S. patent application Ser. No. 12/690,558, filed Jan. 20, 2010, U.S. application Ser. No. 12/695,766, filed Jan. 28, 2010, and U.S. application Ser. No. 12/430,494, filed Apr. 27, 2009, which are incorporated herein by reference in their entirety.

It has been discovered that, through integrating alignment of CNTs and a tailored degree of functionalization of the CNTs, improved interfacial bonding may be achieved while maintaining the strength of the CNTs, thereby allowing for the realization of exceptional high performance CNT composite materials with the potential for mass production. The resultant high-performance composites may be used for EMI shielding, thermal management materials, and structural materials. Notable applications include high-performance aerospace, sporting goods and electronics applications.

Composite Materials

In an exemplary embodiment, a composite material is provided that comprises an array or sheet of functionalized and aligned carbon nanotubes having a degree of functionalization of about 1% to about 10%, and a polymeric matrix material bonded to the array of functionalized and aligned carbon nanotubes. In certain embodiments, the CNTs have a degree of functionalization of about 1% to about 5% or about 4%. The array of functionalized and aligned carbon nanotubes may be in an alignment of about 60% or more, or more preferably about 80% or more.

In certain embodiments, the array of carbon nanotubes is in the form of a nanotube thin sheet or buckypaper. Nanotube sheets may be a particularly useful platform for fabricating high performance composites. The sheets offer easy handling for use in traditional composites processes for fabricating nanocomposites. Furthermore, the fabrication of CNT sheets or buckypapers offers a pathway for producing an array of aligned CNTs in high concentration, which may be particularly beneficial in high performance applications.

Effective functionalization to enhance interfacial bonding and functionality may be crucial for successfully transforming the exceptional properties of carbon nanotubes into engineering applications. To improve the interfacial bonding, certain chemical groups may be grafted on side-walls of nanotubes. Different reaction mechanisms may be used to graft functional groups on nanotube side-walls, including halogenation, hydrogenation, cycloaddition, radical addition, electrophilic addition, addition of inorganic compounds and directly grafting of polymer chains etc. Covalent functionalization may create defects in the nanotube lattice, which also lowers mechanical properties, electrical and thermal conductivity of the CNTs. In high performance applications; however, it may be desirable to maintain the structural integrity of buckypapers when functionalizing the CNTs. It has been discovered that an optimum degree of covalent functionalization (DOF) may be achieved that can improve interfacial bonding without unduly sacrificing intrinsic mechanical properties of CNTs.

As used herein, the term "degree of functionalization", "degree of covalent functionalization" and/or "DOF" refers the ratio of carbon atoms connected with a functional group, such as oxygen atoms, to the total carbon atoms of a CNT. In some embodiments, the CNTs are functionalized by epoxide, carbonyl, or hydroxyl functional groups. The DOF may be about 1% to about 10%, or more preferably about 1% to about 5%, or most preferably about 4%.

In an exemplary embodiment, an expoxide functionalized CNT may be produced by contacting a sheet of CNTs with a peroxyacid, resulting in an electrophilic addition reaction in which an oxygen atom may be grafted on the nanotube to form epoxide group (with no other elements being grafted on to the CNT). An exemplary method for tailoring the DOF of a functionalized CNT array is described in Example 1.

Nanotube alignment may also be important in realizing high mechanical properties. Various methods may be employed to insure a high degree of CNT alignment. For example, the CNTs may be aligned using a mechanical stretching approach, such as that described in U.S. patent application Ser. No. 12/690,558. In some embodiments, nanotube alignment may be achieved by stretching sheets of randomly oriented long CNTs up to approximately 40% strain, which resulted in approximately 80% of the CNTs aligning along the stretch direction. Such results have been verified by polarized Raman analysis.

Figure 2A:
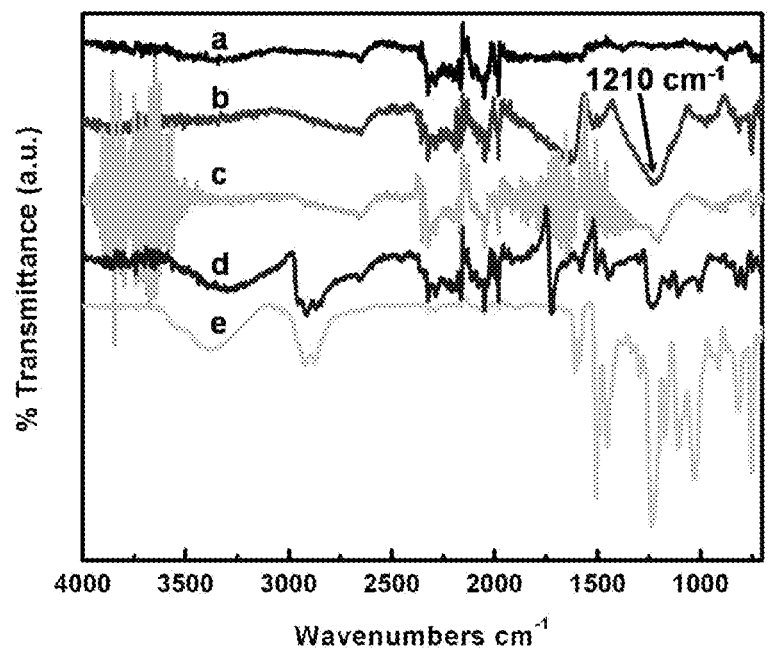
FIG. 2A depicts an ATR-FTIR spectrum comparison of: (a) pristine CNT, (b) functionalized CNT, (c) functionalized CNT sheet/epoxy composites, (d) pristine CNT sheet/epoxy nanocomposites and (e) cured neat epoxy resin.
Figure 2B:
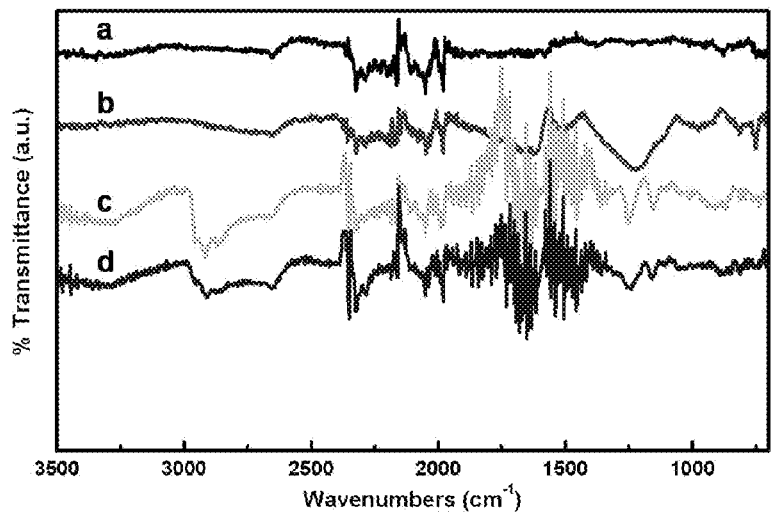
FIG. 2B depicts an ATR-FTIR spectrum comparison of: (a) pristine CNT, (b) functionalized CNT, (c) pristine CNT sheet/BMI nanocomposites, and (d) functionalized CNT sheet/BMI nanocomposites.

In one embodiment, two thermosetting resin systems, epoxy (EPON 862) and bismaleimide (BMI), were chosen as polymer matrices. FIG. 2 shows the attenuated total reflection Fourier transform infrared (ATR-FTIR) spectrum comparison to verify the formation and reaction of the epoxide groups on CNTs. Compared with pristine CNT, the peak at 1210 $cm^{-1}$ of functionalized CNT represents the carbon oxygen stretching frequency of epoxide moiety, which is consistent with the literature reports, as seen in Trace b in FIG. 2A. After curing with epoxy resin, the peak at 1210 $cm^{-1}$ became smaller which suggests that the epoxide ring groups reacted with epoxy resin, as seen in Trace c in FIG. 2A. The ATR- FTIR spectra of pristine CNT sheet/epoxy composite and pure epoxy resin are shown as Traces d and e in FIG. 2A.

It should be noted that the peak at 1210 cm$^{-1}$ may still be seen in the pristine CNT sheet/epoxy composites due to residual epoxy group of EPON 862 (epoxy resin matrix). The same phenomenon is present in Trace e of pure cured expoxy resin with the same curing cycle. The FTIR spectra of pristine and functionalized CNT sheet/BMI composite are shown in Trace c and d in FIG. 2B. After curing with BMI resin (see Trace d), the peak at 1210 cm$^{-1}$ of functionalized CNT disappeared, indicating that the epoxy ring group reacted with BMI resin. Both FTIR spectra were almost same, further confirming that the epoxy rings on the CNT structures reacted to form covalent bonding with the BMI resin matrix.

Schemes 3A and 3B illustrate the proposed reaction mechanisms of CNT with epoxy and BMI resin. The epoxy ring group may be introduced through functionalizing CNT sheets in m-CPBA/CH$_2$Cl$_2$ solutions. Then the epoxy ring groups on the CNTs may react with curing agent-diethyltoluenediamine (DETDA). Finally, derivatives may react with the EPON 862 molecule to form the three dimensional crosslinked structures through Diels-Alder reactions, as shown in Scheme 3A.

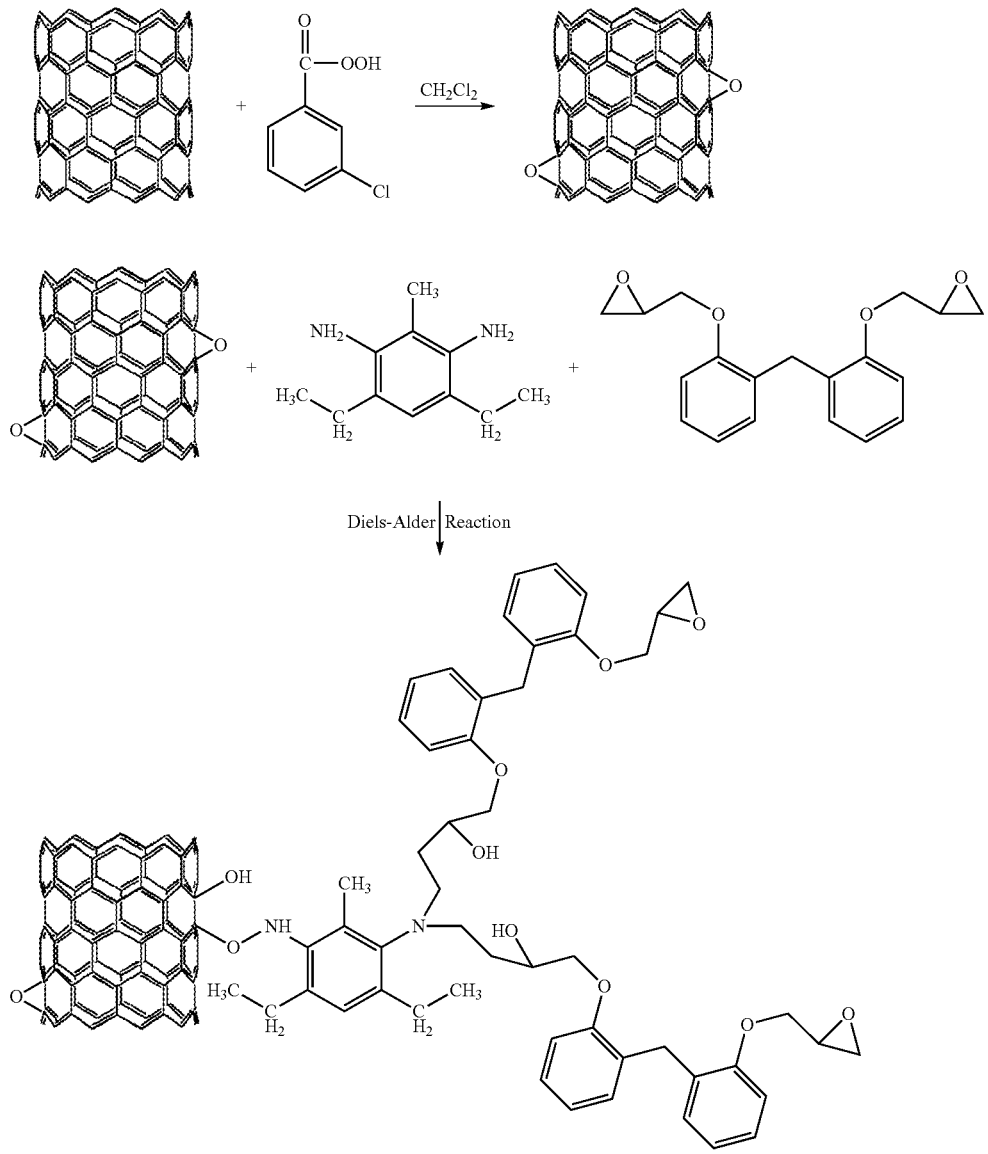

Scheme 3A

For BMI resin system, the epoxide groups of functionalized CNT first may react with o,o'-diallyl bisphenol A according to the mechanism of epoxy-phenol reaction. Then, the derivative may react with the other two BMI components to form the three-dimensional crosslinked structure through ENE and Diels-Alder reactions, as shown in Scheme 3B.

Scheme 3B

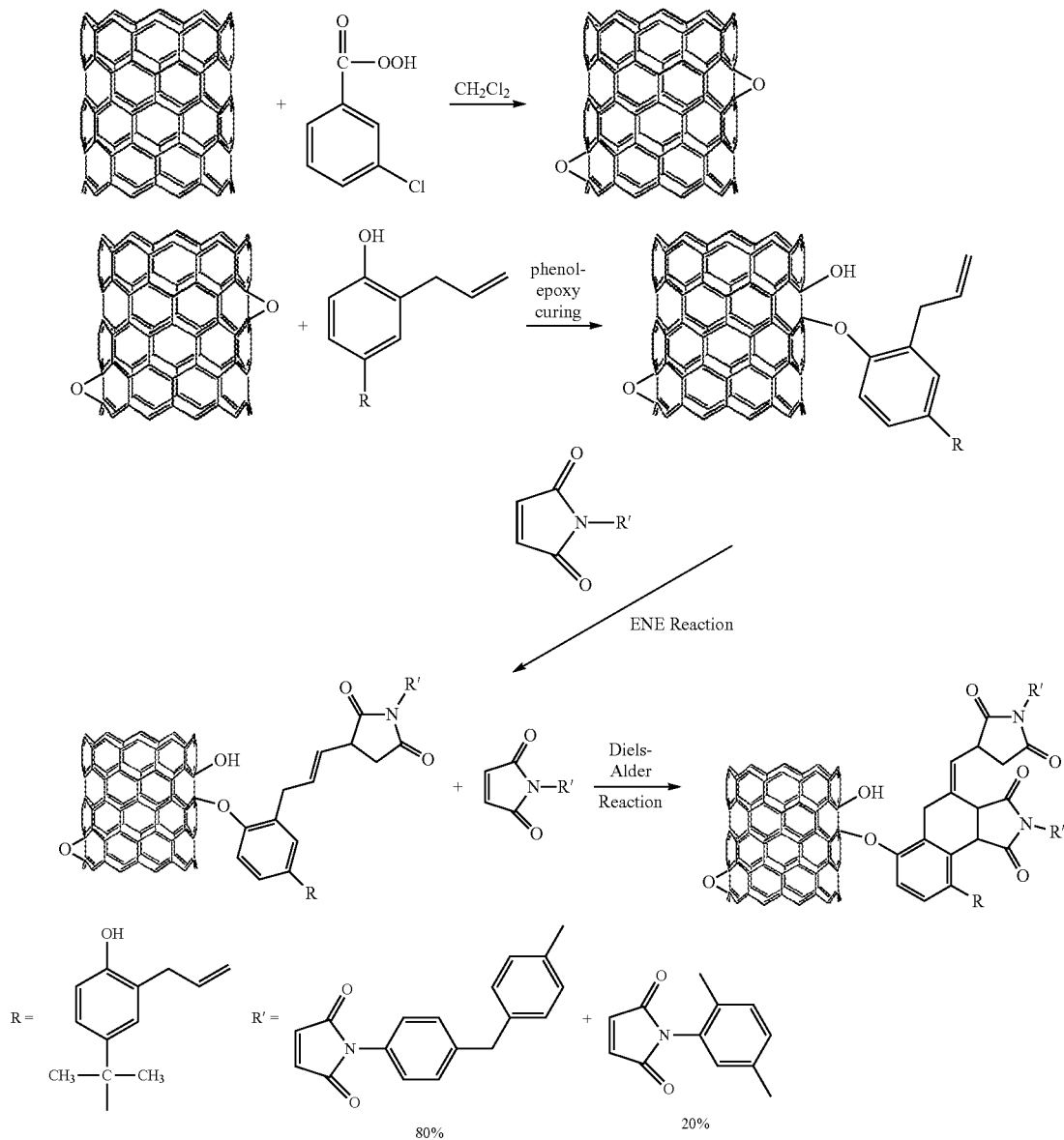

Figure 3:
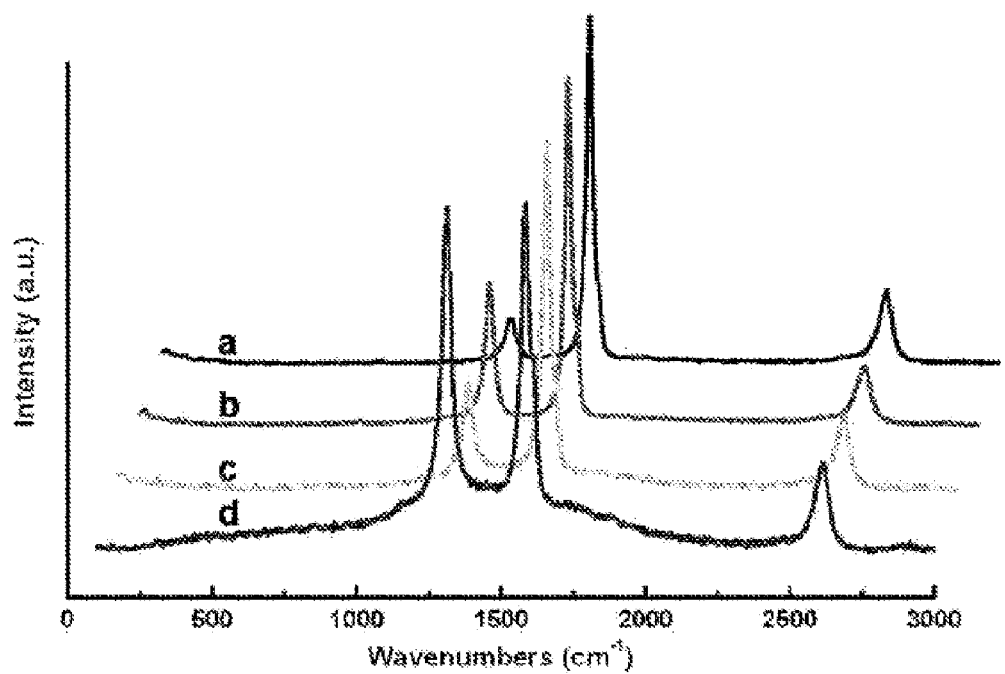
FIG. 3 depicts a Raman spectra comparison of (a) pristine CNT, (b) functionalized CNT, (c) pristine CNT sheet/epoxy composite and (d) functionalized CNT sheet/epoxy composite.

Raman spectrometry was also used to verify the proposed reaction mechanism. As shown in FIG. 3, the R-value ($I_D/I_G$) of pristine CNT was 0.13, which indicates the quality of CNT is very good with a lower defect density. After the functionalization, the $I_D/I_G$ value increased up to 0.41, which indicates an epoxy ring formed on the structure of CNTs. For the pristine CNT sheet/epoxy composite, the $I_D/I_G$ value increased to 0.30 due to the coupling with cured epoxy crosslinked networks.

Figure 4:
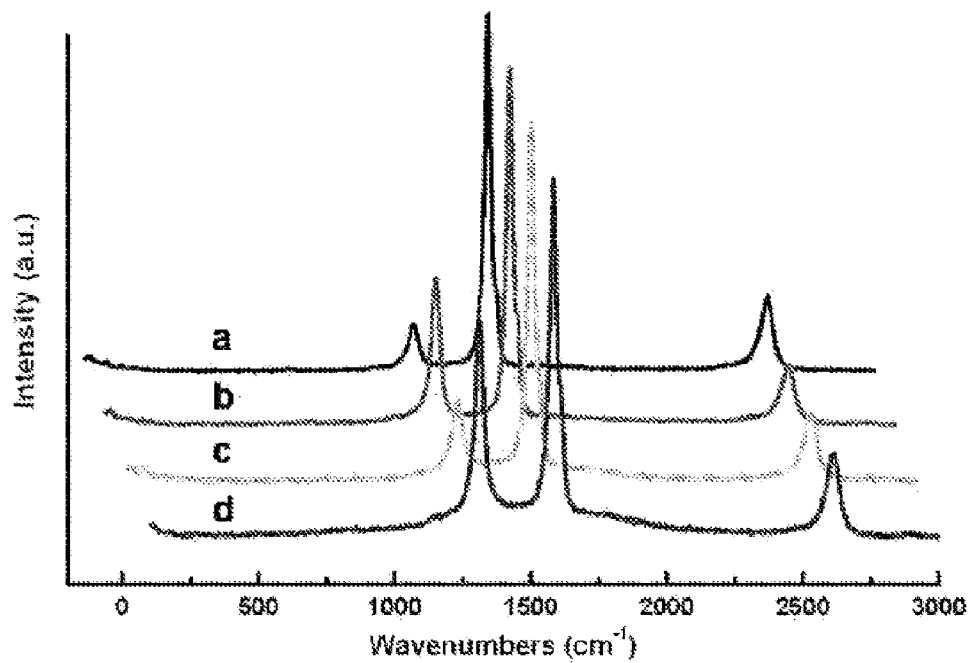
FIG. 4 depicts a Raman spectra comparison of (a) pristine CNT, (b) functionalized CNT, (c) pristine CNT sheet/BMI composite and (d) functionalized CNT sheet/BMI composite.
Figure 4A:
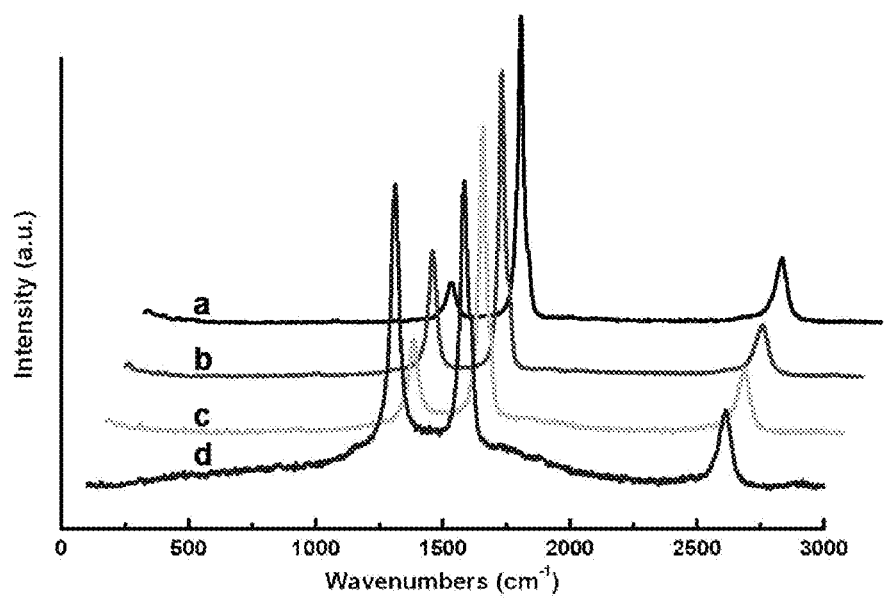
Figure 4B:
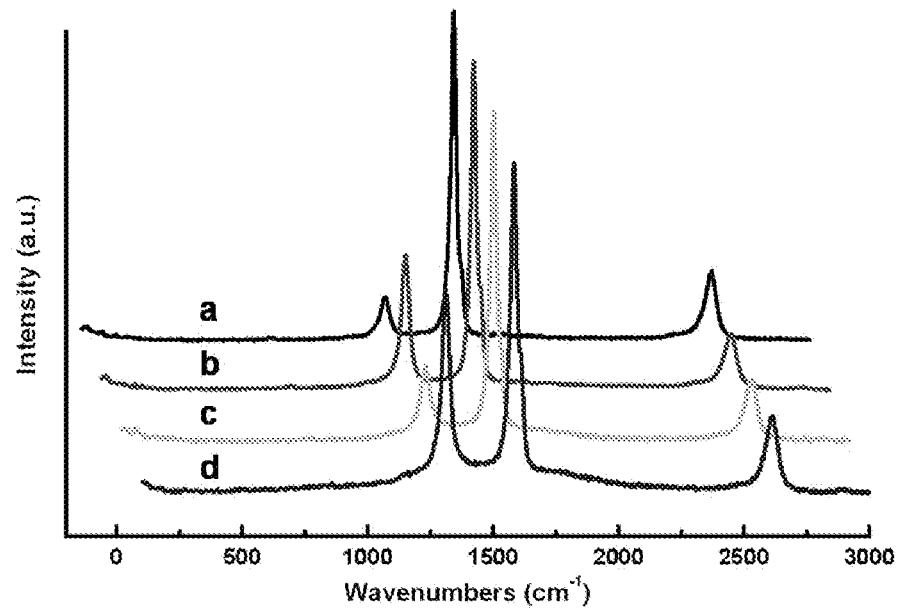

For functionalized CNT sheet/epoxy composite, the $I_D/I_G$ value further increased up to 0.99, indicating an increased and stronger interaction between the CNTs and resin matrix due to the formation of chemical bond between the functionalized CNT and the epoxy resin. A similar result was observed in the BMI resin system, as illustrated in FIG. 4. In the pristine CNT/BMI composite, the $I_D/I_G$ value increased to 0.23 due to the coupling effect of CNTs and BMI crosslinked structure molecule. For functionalized CNT/BMI composite, the $I_D/I_G$ further increases up to 0.62.

Figure 5:
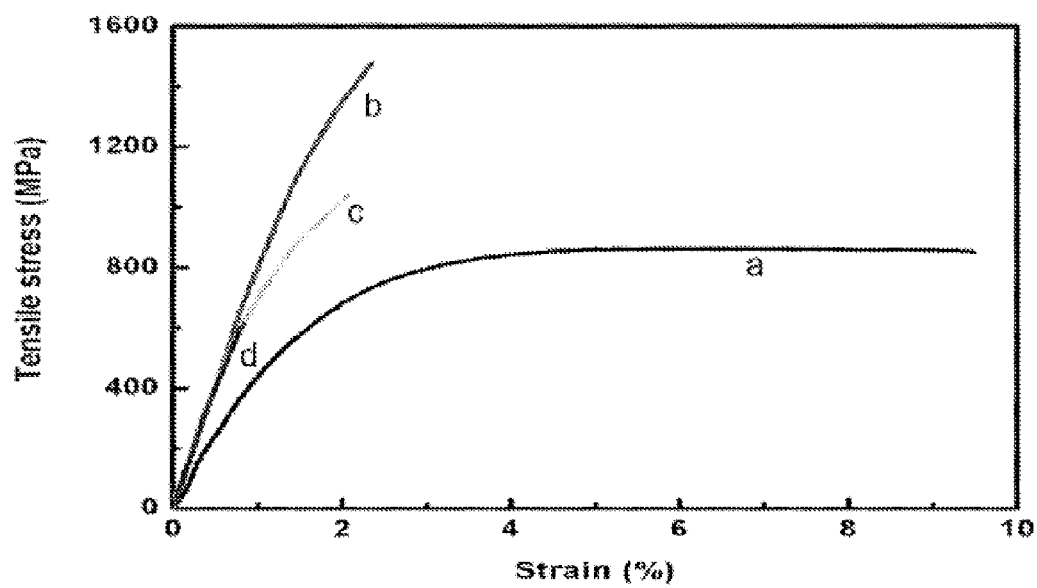
FIG. 5 depicts comparisons of tensile stress-strain curves of random CNT sheets reinforced epoxy composites with different degrees of functionalization.

To study the effects of different DOF on the mechanical properties of nanocomposites, the DOF values of random CNT sheets were tailored to 4%, 10% and 18%. FIG. 5 shows the mechanical properties of resultant nanocomposites. Line a represents pristine random CNT reinforced expoxy composite. Line b represents functionalized random CNT reinforced expoxy composite with 4% DOF. Line c represents functionalized random CNT reinforced expoxy composite with 10% DOF. Line d represents functionalized random CNT reinforced expoxy composite with 18% DOF. For the pristine random CNT sheet nanocomposites, the tensile strength and Young's modulus were 851 MPa and 45 GPa, respectively. After functionalization, the Young's modulus of CNT sheet nanocomposite increased. However, for all three different DOFs, the Young's modulus was almost same at 80 GPa.

While not wishing to be bound by a particular theory, it is believed that the effect of interfacial bonding between nanotubes and epoxy resin on load transfer efficiency may be substantially similar in each functionalized case; however, because the tensile strength decreased in resultant nanocomposites having higher DOF, it is believed that the higher DOF damages the CNT structure and therefore degrades CNT mechanical properties. It is believed that a DOF of about 1% to about 10%, or more preferably about 1% to about 5%, or most preferably about 4% is adequate to substantially enhance load transfer between epoxy resin and functionalized CNTs without large strength degradation in the resultant nanocomposites.

The matrix material may comprise any suitable material which produces the desired result. For example, the matrix material may comprise at least one epoxide, bismaleimide (BMI), polymer, polyimide, canatye, thermoplastic, polyether-ether-ketone (PEEK), polyphenylene sulfide (PPS), polysulfone (PSF), self-reinforcing polymer, PARMAX® (Solvay Advanced Polymers), polyethersulfone (PES), polycarbonate, or any combination thereof. The matrix material may be substituted with one or more reactive functional groups.

Active epoxide groups on CNTs created through the chemical functionalization can be reacted with amine and phenolic hydroxyl groups. Hence, the interfacial bonding between nanotube and matrices, such as epoxy and bismaleimide (BMI) resin, can be improved in the resultant nanocomposites. Particularly, the proper combination of alignment enhancement and tailored functionalization led to record high mechanical and electrical performance. This method successfully demonstrates a method to effectively utilize carbon nanotubes to realize high mechanical properties exceeding the state-of-the-art carbon fiber composites systems, which are widely used, for example, in the aerospace, defense and sporting goods industries.

To quantify load transfer efficiency improvement, a load transfer efficiency-DOF model may be considered. Specifically, a modified rule of mixtures (ROM) equation may be employed to predict properties of discontinuous short fiber reinforced polymer composite. The standard ROM equation assumes a perfect load transfer efficiency between fibers and resin matrix. Since this condition is not true for CNT reinforced nanocomposites, as evidenced by many CNT pullouts without breaks and very low mechanical performance, a modified ROM equation, which considers the effect of load transfer efficiency, is illustrated in Equation (1).

$$E_c = \eta_0 \cdot \eta_L \cdot \eta_B \cdot V_f \cdot E_f + (1-V_f) \cdot E_m \quad (1)$$

where $E_c$, $E_m$, and $E_f$ are Young's modulus of the resultant composites, matrix and CNTs, respectively. $V_f$ is the volume fraction of the CNTs. The orientation factor, $\eta_0$, was introduced to account for fiber orientation effect. It equals 1 for fully aligned fibers. For randomly oriented fibers, the $\eta_0$ value is 0.33.

The length efficiency factor, $\eta_L$, was introduced to account for the efficiency of load transfer from the matrix to the fibers due to aspect ratio effect. $\eta_L$ can vary between 0 and 1. In this study, the length of the CNTs is approximate in the millimeter long level, which is much larger than the diameter of the CNTs at 3-8 nm; therefore the $\eta_L$ may be set as 1. Herein, we define the interfacial bonding efficiency factor, $\eta_B$, which is used to account for load transfer efficiency due to interfacial bonding quality between fiber and matrix. Equation (1) may be converted into a logarithmic form to obtain Equation (2)

$$lg(E_c - (1-V_f) \cdot E_m) = lg(\eta_B) + lg(\eta_0 \cdot \eta_L) + lg(V_f E_f) \quad (2)$$

Figure 6A:
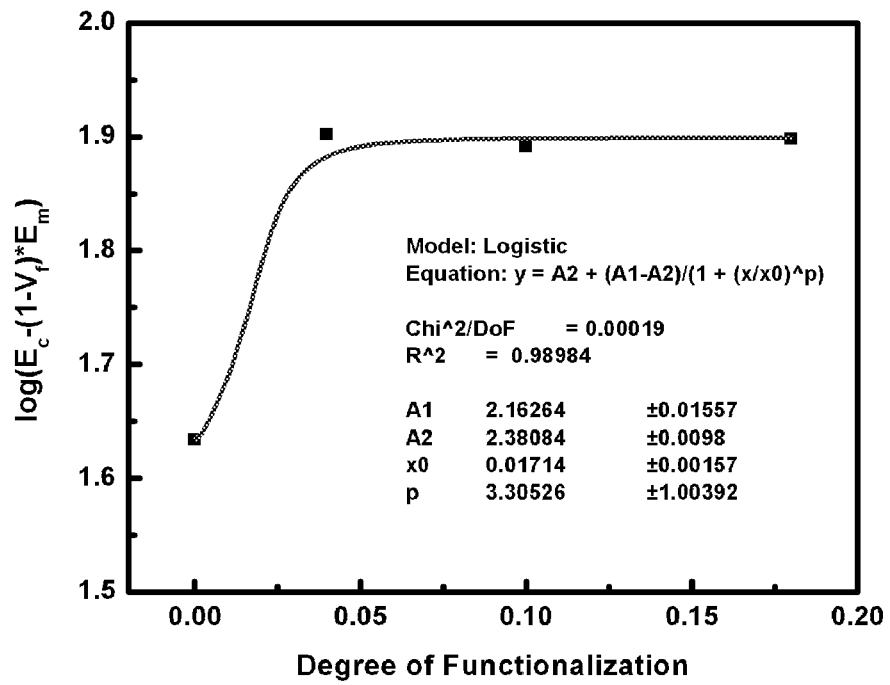
FIG. 6A depicts how the interfacial bonding efficiency factor $\eta_B$ dramatically increases with the increase of degree of covalent functionalization (DOF) values initially, and then tend to become constant and saturated.
Figure 6B:
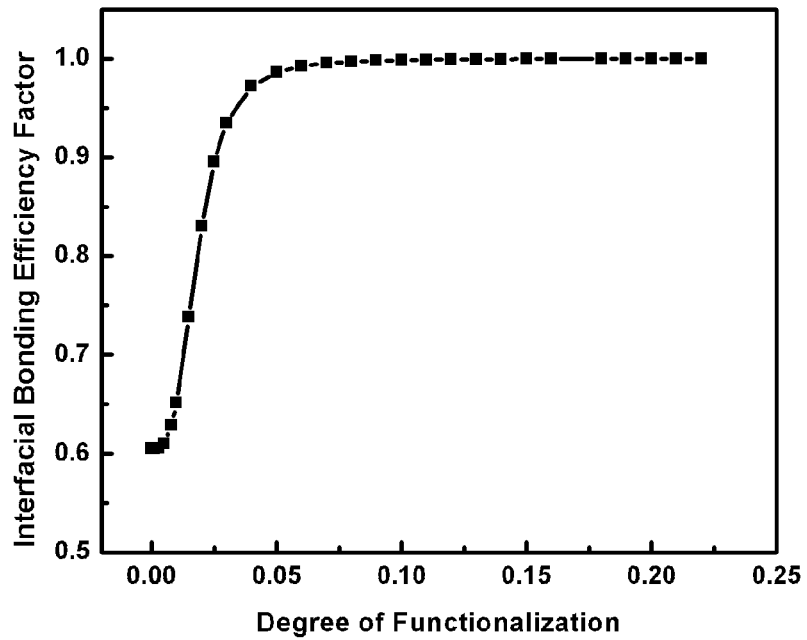
FIG. 6B depicts how the interfacial bonding efficiency factor $\eta_B$ dramatically increases with the increase of DOF values initially, and then tend to become constant and saturated.

It may be assumed that $\eta_B$ is a function of DOF. Utilizing the results shown in FIG. 5, one obtains the curve of $lg(E_c - (1-V_f) \cdot E_m)$ versus DOF as shown in FIG. 6A. Through logistic fitting, the relationship between $\eta_B$ and DOF may be determined, as shown Equation (3) and FIG. 6B.

$$\eta_B = 10^{\frac{-0.2182}{1+6.87 \times 10^5 \times (DOF)^{3.3}}} \quad (3)$$

If DOF=0, we have the $\eta_{B,0}$=0.605, which means the load transfer efficiency induced by non-binding interfacial interactions is only 60.5% for the pristine CNT sheet of millimeter long nanotubes. If DOF=0.04, we have the $\eta_{B,0.04}$=0.972, indicating an acceptable load transfer efficiency in some embodiments. As discussed previously, it has been found that a DOF of 0.04 may not lead to dramatic CNT property degradation. Equation (3) also demonstrates that $\eta_B$ dramatically increases with the increase of DOF values at the beginning, e.g., up to about 4% and then tends to become constant and saturated. This model is in a very good agreement with simulation results.

Methods of Making Composite Materials

Methods are also provided for producing CNT composite materials having exceptional properties. In one embodiment, the method includes aligning the carbon nanotubes in a carbon nanotube sheet, and functionalizing the sheet of carbon nanotubes to produce a sheet of functionalized carbon nanotubes having a degree of functionalization between about 1% to about 10%; and, thereafter impregnating the sheet of functionalized and aligned carbon nanotubes with a matrix material and allowing the sheet of functionalized and aligned carbon nanotubes bond with the matrix material, which may be a mixture of polymer resin and current agent. The term "impregnating" as used herein in the context of buckypaper composites refers to a technique in which substantially all of the pores of the buckypaper are filled.

In an exemplary embodiment, the curing agent may include at least two chemical features selected from the group consisting of: an amine, a hydroxyl group, and a double bond. In certain embodiments, the curing agent is DETDA. In another embodiment, the curing agent is 2-allyl-4-t-butylphenol.

The matrix material may be any matrix material suitable for providing the desired properties. In certain embodiments, the matrix material comprises a material that will bond with the functional groups added to the carbon nanotubes. For example, the matrix material may comprise an epoxide, bismaleimide (BMI), polyimide, canatye, thermoplastic, polyether-ether-ketone (PEEK), polyphenylene sulfide (PPS), polysulfone (PSF), self-reinforcing polymer, PARMAX® (Solvay Advanced Polymers), polyethersulfone (PES), polycarbonate, or any combination thereof. In a certain embodiment, the matrix material is bis(2-(oxiran-2-ylmethoxy)phenyl)methane.

The carbon nanotubes may be functionalized to possess a desired functional group. In some embodiments, the functional group is an expoxide, hydroxyl, or carbonyl. In certain embodiments, the sheet of carbon nanotubes is functionalized by contacting the sheet of carbon nanotubes with a peroxyacid. In an exemplary embodiment, the peroxyacid is m-CPBA.

The carbon nanotubes may be aligned by various methods. In some embodiments, the carbon nanotubes may be aligned by mechanically stretching the sheet of carbon nanotubes. In some embodiments the sheet of carbon nanotubes may be stretched by about 30% or more. In certain embodiments, the sheet of carbon nanotubes may be stretched by about 40% or more. In an exemplary embodiment, the carbon nanotubes are aligned to an alignment of about 60% or more, or more preferably about 80% or more.

Example 1

M-chloroperoxylbenzoic acid (m-CPBA) (purchased from Sigma Aldrich, 75 wt. %, used as received) was chosen as the peroxyacid to functionalize the CNT sheets. Nanotube sheets were purchased from Nanocomp Technology (Concord, N.H.). To determine DOF values, m-CPBA/dichloromethane solutions of 0.5%, 1%, 2%, 5% and 10% by weight concentrations were made. The functionalization was conducted at room temperature with varying reaction times from 10 min to 30 hours.

The CNT sheets were immersed into the solution for various time intervals at room temperature (22-25° C.), and removed to complete the functionalization without damaging the sheet's structural integrity. The DOF values were determined by the thermogravimetric analysis (TGA) at a temperature range of 50-800° C. under nitrogen atmosphere. FIG. 1 shows the curves of DOF versus functionalization time in the different m-CPBA concentrations. For all cases, the DOF values initially quickly increased with the reaction time increase, and then reached almost to a maximum and constant value. For same treatment time, the DOF increased with the increase of m-CPBA concentration. Based on these experimental results, desired DOF can be accurately tailored through adjusting reaction time and m-CPBA solution concentration.

Example 2

Figure 7A:
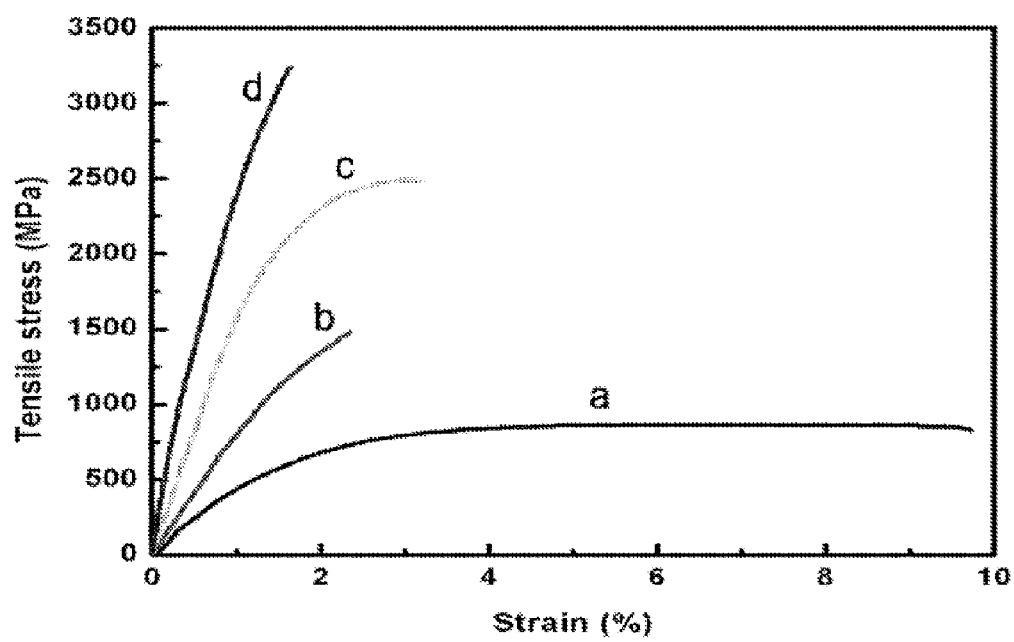
FIG. 7A depicts typical tensile stress-strain curves of the random and aligned CNT sheet reinforced epoxy composites illustrating significant improvement of mechanical properties through alignment and functionalization.
Figure 7B:
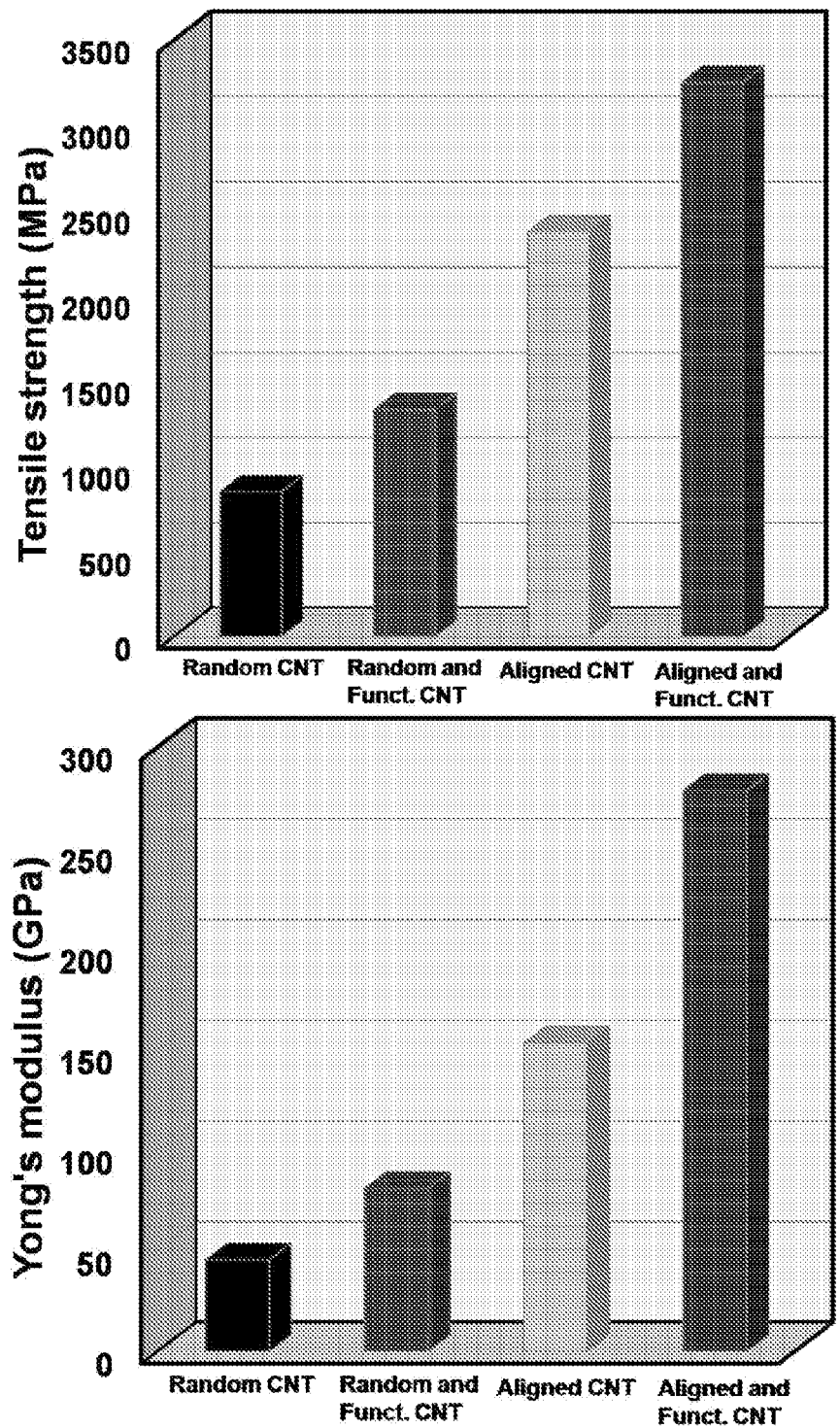
FIG. 7B compares the tensile strength and Young's modulus measurements of the resultant composites with and without alignment and functionalization.

Stress-strain curves of CNT sheet reinforced epoxy nanocomposites with and without alignment and functionalization are illustrated in FIG. 7A. Line a represents a pristine random CNT sheet reinforced epoxy composite material. Line b represents a functionalized random CNT sheet reinforced epoxy composite material. Line c represents an aligned CNT sheet reinforced epoxy composite material. Line d represents a functionalized and aligned CNT sheet reinforced epoxy composite material. After functionalization, the tensile strength and Young's modulus of the random CNT sheets nanocomposites increased to 1333 MPa and 80 GPa, respectively, as shown in FIG. 7B. Such performance is comparable to carbon fiber fabric composites. On the other hand, the tensile failure strain of the pristine random CNT sheet nanocomposites reached 8.21%, which is much higher than that (3.5-5%) of conventional carbon fiber fabric composites.

It is believed that these results are attributed to two factors. First, the pure randomly oriented CNT sheets may have good deformation ability due to entanglements and slippages in randomly oriented networks of long CNTs. Second, the tensile strain of epoxy EPON 862 can reach as high as 10.87% and possible interface slippage between CNT and resin matrix may allow large deformation of the CNT networks within the composites. After functionalization, the interfacial bonding may be dramatically enhanced due to the formation of chemical bonds between CNT and epoxy resin, which greatly constrains the slippage between CNTs and interface of CNTs and epoxy resin and results in the low tensile strain of resultant nanocomposites.

The tensile strength, Young's modulus and failure strain of the aligned CNT composites were 2,375 MPa, 153 GPa and 3.2%, respectively. These results exceeds the mechanical properties of AS4 and T300 unidirectional carbon fiber epoxy composites. In particular, the failure strain is double that of AS4 composites. After functionalization, the tensile strength and Young's modulus increased to 3,252 MPa, and 279 GPa, respectively. This is 180% and 350% higher than the tensile strength and Young's modulus that has been observed in coagulation-spun, single-walled carbon nanotubes/polyvinyl alcohol composites. The failure strain of functionalized aligned CNT nanocomposites dropped to 1.6% from 3.2%. This drop in failure strain is believed to be the result of the chemical bond formation between CNT and epoxy resin.

Figure 7C:
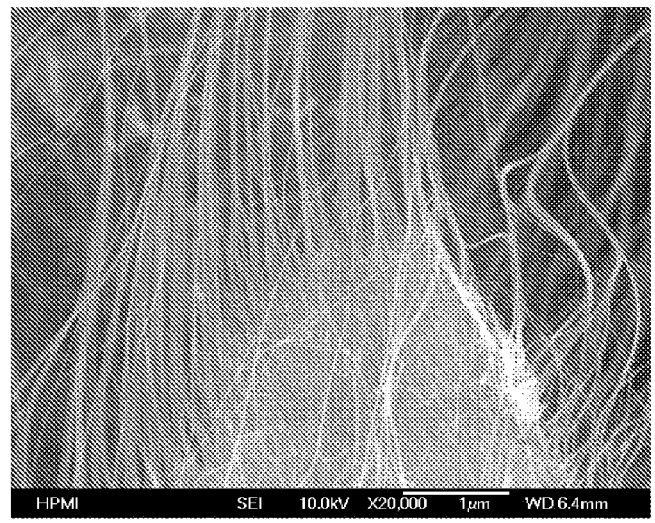
FIGS. 7C and 7D are scanning electron microscopy (SEM) images of fracture morphology of pristine aligned CNT sheet reinforced epoxy composites.
Figure 7D:
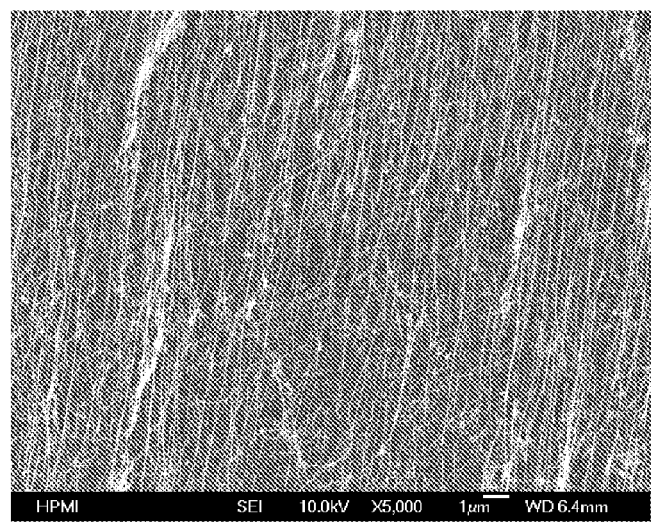
Figure 7E:
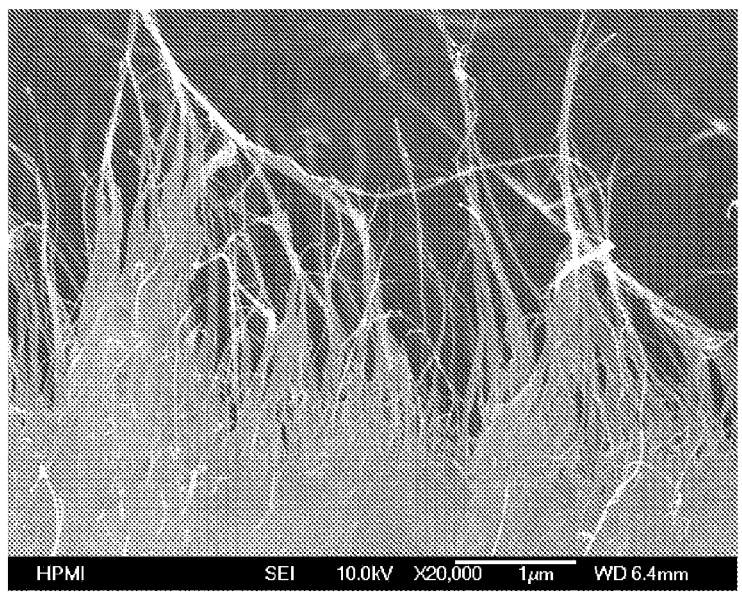
FIGS. 7E and 7F are SEM images of fracture morphology of functionalized aligned CNT sheet reinforced epoxy composites.
Figure 7F:
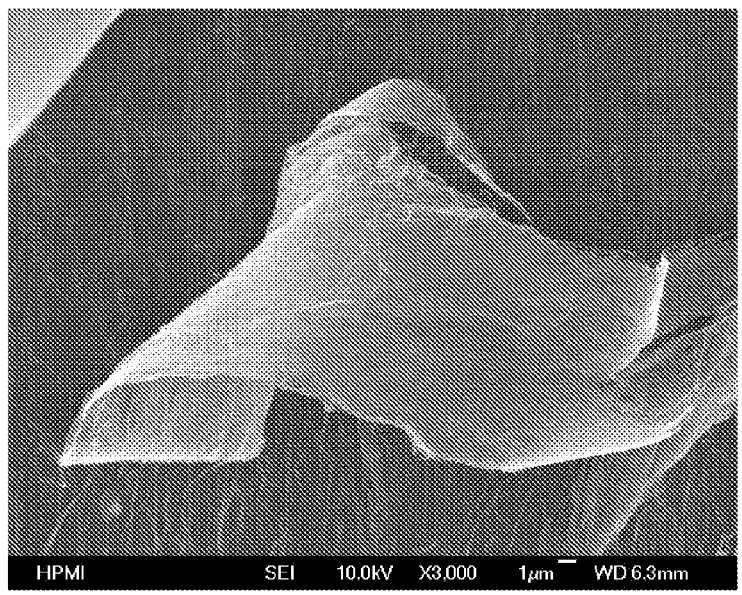

FIG. 7C shows the fracture surface morphology of pristine aligned CNT sheet reinforced epoxy composite specimen after tensile tests. The pristine aligned CNT sheet/epoxy composite exhibited high tensile strength. FIG. 7D shows the nanotubes separated from the epoxy resin after tensile tests, indicating poor interfacial bonding between pristine CNT and epoxy resin. After functionalization, some of broken nanotubes can be observed in the fracture surface of the functionalized aligned CNT sheet/epoxy composite, as illustrated in FIG. 7E. The fractures provide evidence that resultant composite had better interfacial bonding between functionalized CNT and epoxy resin, which is believed to influence the exceptionally high mechanical properties observed in aligned and functionalized CNT composites. FIG. 7F shows a thin film formed of functionalized CNT bonded with epoxy resin at the fracture surface, which further shows the improved interfacial bonding.

Figure 8A:
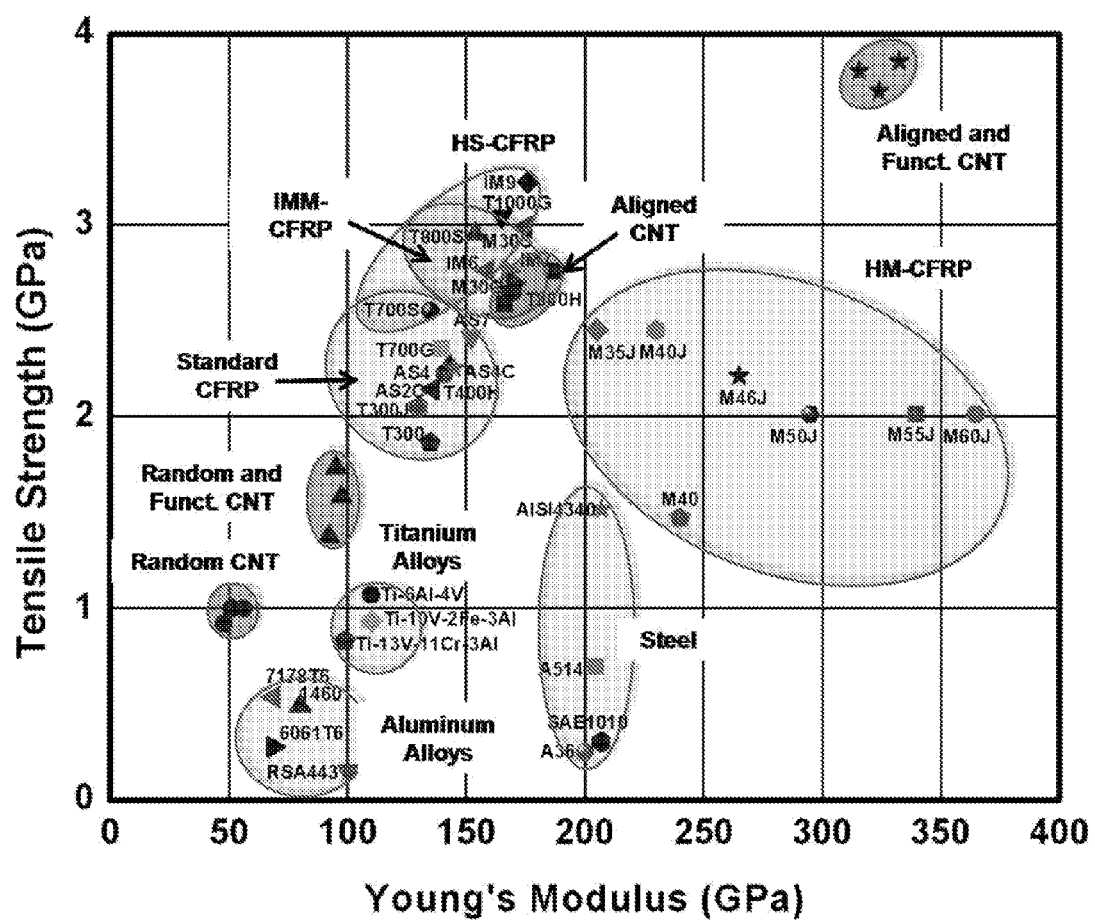
FIG. 8A depicts a tensile strength and modulus comparison of the CNT sheet reinforced epoxy composites with unidirectional carbon fiber reinforced plastics or composites (CFRP) with 60% fiber or CNT volume fraction, and typical metal materials for structural applications; CNT composites showing exceptional integration of high strength, modulus and large failure strain beyond current CFRP systems. IMM-CFRP: immediate modulus CFRP, HS-CFRP: high strength CFRP, HM-CFRP: high modulus CFRP.

When normalized to 60% reinforcement volume fraction, the tensile strength of the functionalized and aligned CNT/epoxy composites was 10-20% higher than the state-of-the-art high-strength type aerospace-grade structural CFRP systems, as seen in FIG. 8A, and about 6×, 3× and 2× greater than aluminum alloys, titanium alloys and steels for structural applications, respectively.

Figure 8B:
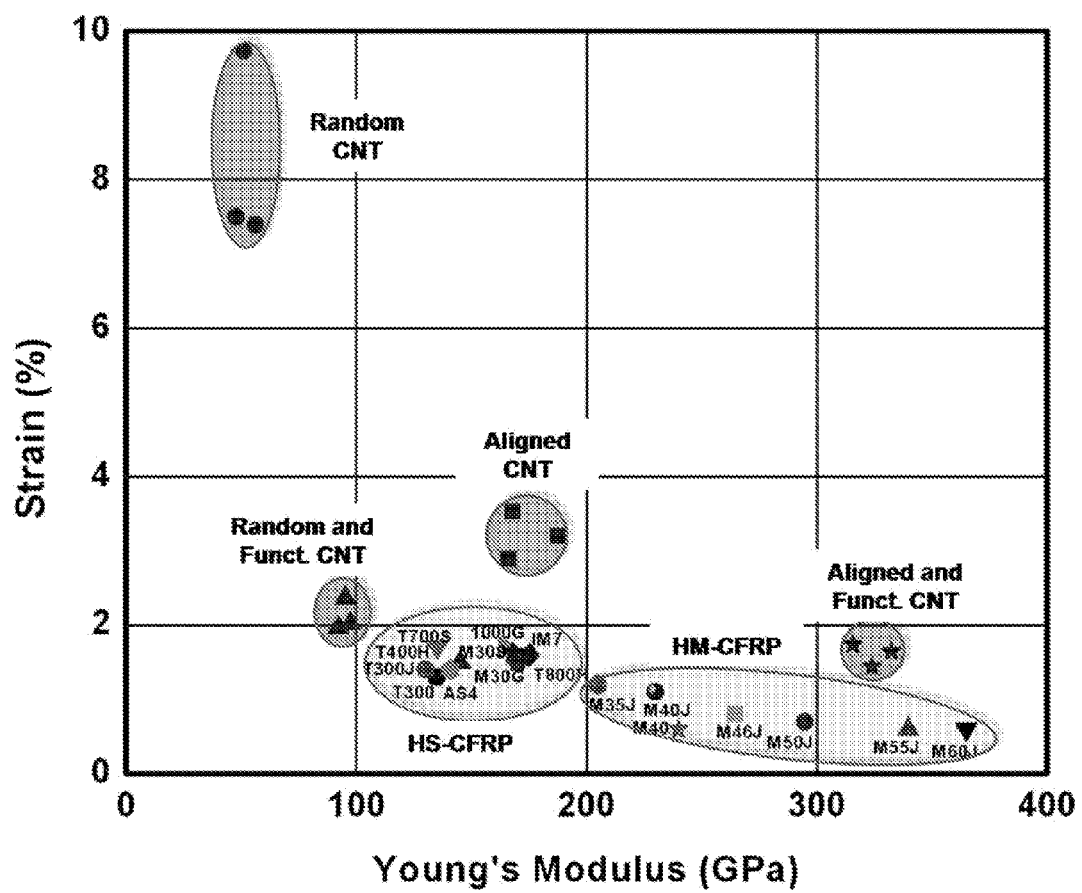
FIG. 8B depicts the failure strain comparison of the aligned and functionalized CNT sheet reinforced epoxy composites and CFRP composites, showing more than 200% higher failure strain of the CNT sheet composites compared to same modulus CFRP systems; the strain to failure of randomly oriented CNT sheet reinforced epoxy composites is 8.21%.

The Young's modulus of the resultant CNT composites was 2× greater than typical unidirectional AS4, IM7, T300, T700 and T1000 CFRPs, and close to the best high-modulus CFRP systems (M55J and M60J graphite fiber composites). The strain of the nanotube composite was approximately 200% higher than the CFRP systems at the same level of Young's modulus, as seen in FIG. 8B, which is a critical improvement toward developing more resilient composites. The measured density of the CNT composites is 1.53 g/cm$^3$, which is slightly less than carbon fiber composites.

Example 3

Figure 9A:
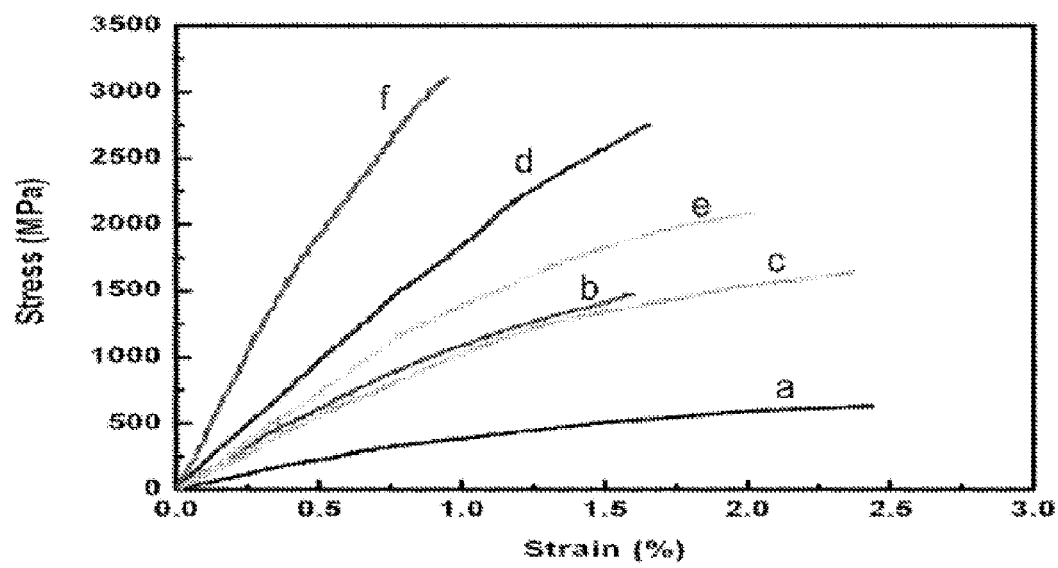
FIG. 9A depicts typical tensile stress-strain curves of the random and stretch-aligned CNT sheet/BMI composites with and without functionalization, illustrating significant improvement of mechanical properties through alignment and functionalization.
Figure 9B:
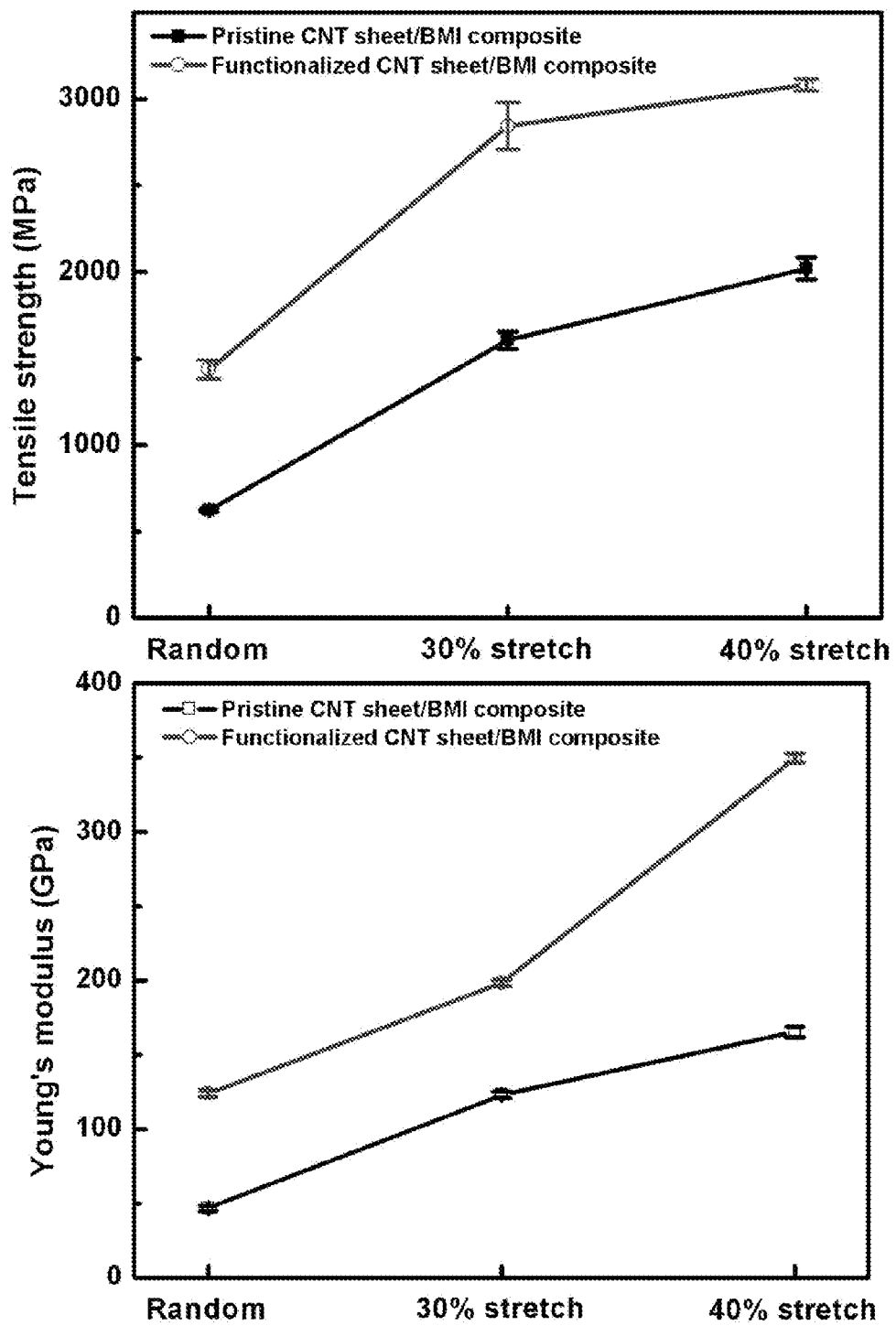
FIG. 9B compares the tensile strength and Young's modulus measurements of the resultant composites with and without functionalization.

In this embodiment, a high glass transition temperature resin bismaleimide (BMI, CYCOM 5250-4 RTM, Cytec) was evaluated. FIG. 9A illustrates a stress-strain curves of CNT sheet reinforced BMI nanocomposites along the nanotube alignment direction. Line a represents a pristine random CNT sheet reinforced composite material. Line b represents a functionalized random CNT sheet reinforced composite material. Line c represents a 30% stretched CNT sheet reinforced composite material. Line d represents a functionalized 30% stretched CNT sheet reinforced composite material. Line e represents a 40% stretched CNT sheet reinforced composite material. Line f represents a functionalized 40% stretched CNT sheet reinforced composite material. The detail tensile strength and Young's modulus of the samples are compared in the FIG. 9B. For pristine CNT sheet reinforced BMI nanocomposites, the tensile strength and Young's modulus increased with an increase in alignment.

The results show the degree of alignment of nanotubes can reach as high 80% along the axial direction when the CNT sheet is stretched up to 40%. The tensile strength and Young's modulus of the resultant CNT sheet/BMI composites are as high as 2,088 MPa and 169 GPa, respectively. After the functionalization to introduce epoxy groups on the CNTs, the mechanical properties of the resultant nanocomposites are further improved. The tensile strength and Young's modulus of functionalized random CNT sheet/BMI nanocomposites reach up to 1,437 MPa and 124 GPa, respectively, which is two times more than that of pristine random CNT sheet/BMI nanocomposites. For functionalized 30% stretch alignment CNT sheet/BMI nanocomposites, the tensile strength and Young's modulus reached 2,843 MPa and 198 GPa, which is 78% and 62% better than that of the pristine 30% stretch alignment CNT sheet/BMI nanocomposites.

For functionalized 40% stretch alignment CNT sheet/BMI nanocomposites, the tensile strength and Young's modulus reached 3,081 MPa and 350 GPa, which are 48% and 107% improvements than that of pristine 40% stretch CNT sheet/BMI nanocomposites. However, the failure strain of functionalized CNT sheet/BMI nanocomposites decreased sharply, as seen in FIG. 9A. The failure strain of functionalized 40% stretch alignment CNT sheet/BMI nanocomposites dropped to 0.95%. The reduction in failure strain is believed to be influenced by two factors. First, the formation of covalent bonding may significantly reduce nanotube pullout and restricted nanotube network deformation capability. Second, the nanotube may be structural damage due to the functionalization, resulting in reduced ductility of the CNTs.

It has been found that the degree of functionalization is an important parameter that should be tailored to improve strength and modulus without sacrificing failure strain. In an exemplary embodiment, it was found that by tailoring the degree of functionalization to 4%, CNT damage and failure strain reduction may be minimized in CNT composites.

Figure 9C:
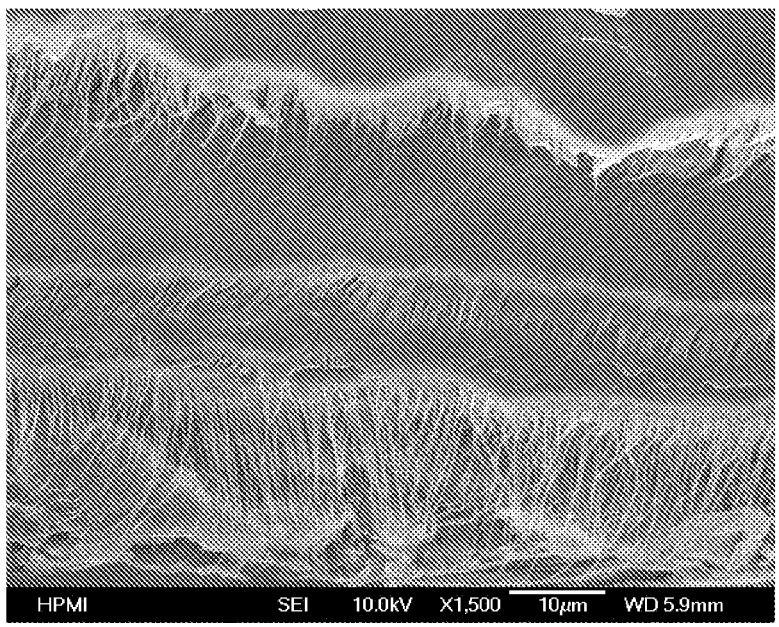
FIGS. 9C and 9D are SEM images of typical fracture surface morphology of functionalized CNT sheet/BMI composite with 40% stretch alignment.
Figure 9D:
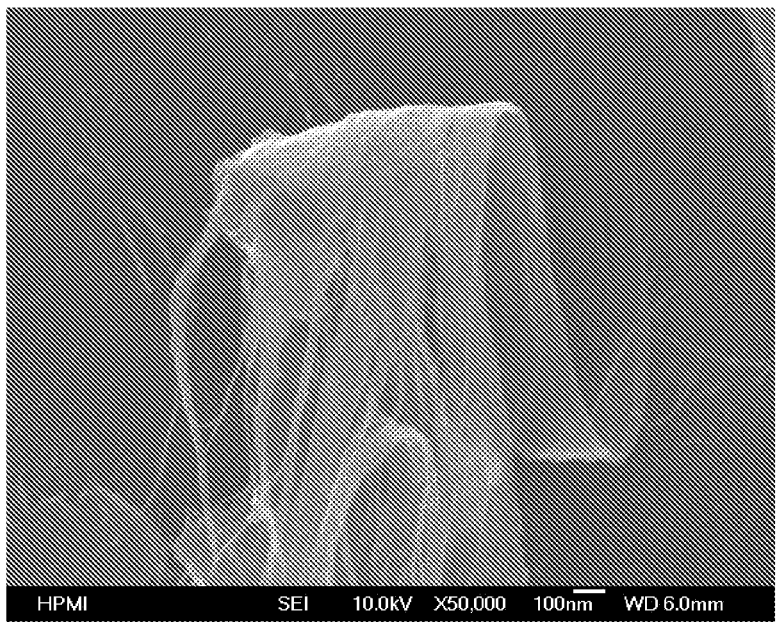

FIGS. 9C and 9D show the fracture surface morphology of a functionalized 40% stretch alignment specimen after tensile testing. Rather than peeling off as seen in the pristine CNT sheet/BMI samples previously reported, the BMI resin and aligned CNT layers adhered very well, indicating good interfacial bonding. Although the interfacial bonding and load transfer efficiency improved with this chemical functionalization, resulting in record-setting mechanical properties exceeding that of the state-of-the-art aerospace-grade unidirectional carbon fiber composites, CNT slippage and pulled-out modes were still observed.

Example 4

Figure 10A:
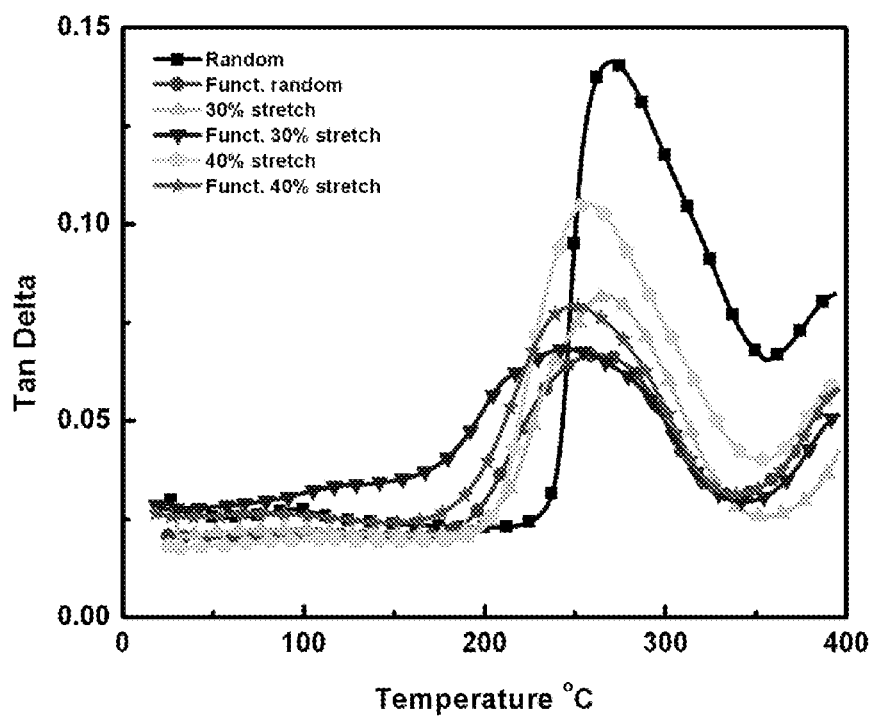
FIG. 10A depicts comparison of tan delta curves.
Figure 10B:
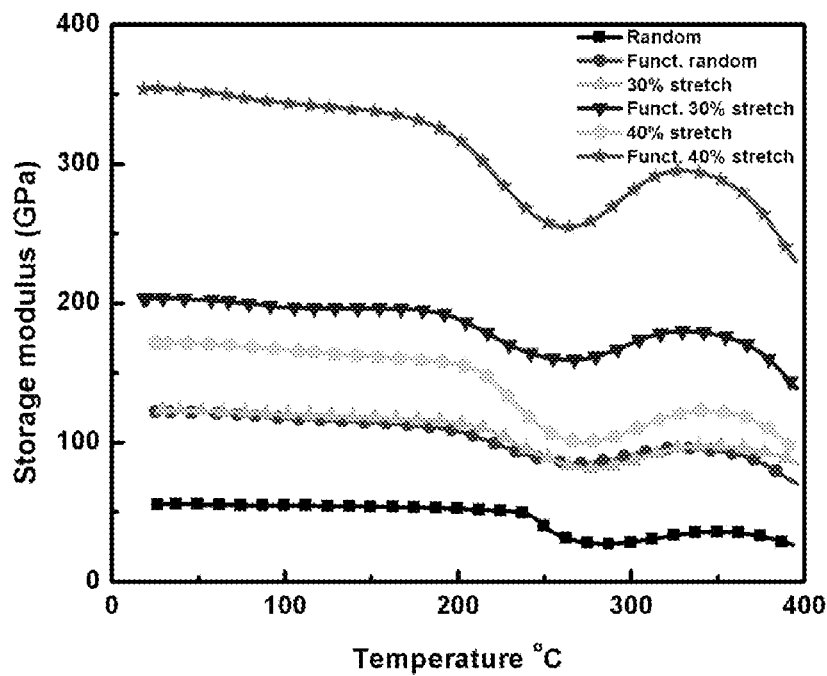
FIG. 10B depicts storage moduli of the CNT sheet/BMI composite with and without functionalization.

FIGS. 10A and 10B show dynamic mechanical analysis (DMA) results. Table 1 shows the storage modulus of the samples. The $T_g$s of all CNT sheet/BMI composites dropped with the high loading of CNTs, possibly caused by a resulting reduced crosslink density of the BMI resin matrix. Compared with pristine CNT sheet/BMI composites, the $T_g$ of functionalized CNT composites further dropped, which may be due to the epoxy groups of functionalized CNTs reacting and consuming some functional groups of BMI resin, and hence further reducing the crosslinks. However, the $T_g$ drop of the functionalized CNT/BMI composites was 23° C., and the composites still had a $T_g$ of 247° C. for high temperature applications.

TABLE 1

Comparison of storage modulus and glass transition temperature (Tg) of CNT sheet/BMI composites with and without functionalization.

| Specimen | Storage modulus (GPa) | $T_g$ (° C.) |
|---|---|---|
| Pristine random CNT sheet/BMI composite | 55 | 269.98 |
| Functionalized random CNT sheet/BMI composite | 122 | 262.67 |
| Pristine 30% stretch CNT sheet/BMI composite | 123 | 266.77 |
| Functionalized 30% stretch CNT sheet/BMI composite | 203 | 241.80 |
| Pristine 40% stretch CNT sheet/BMI composite | 172 | 256.70 |
| Functionalized 40% stretch CNT sheet/BMI composite | 354 | 247.44 |

Figure 10C:
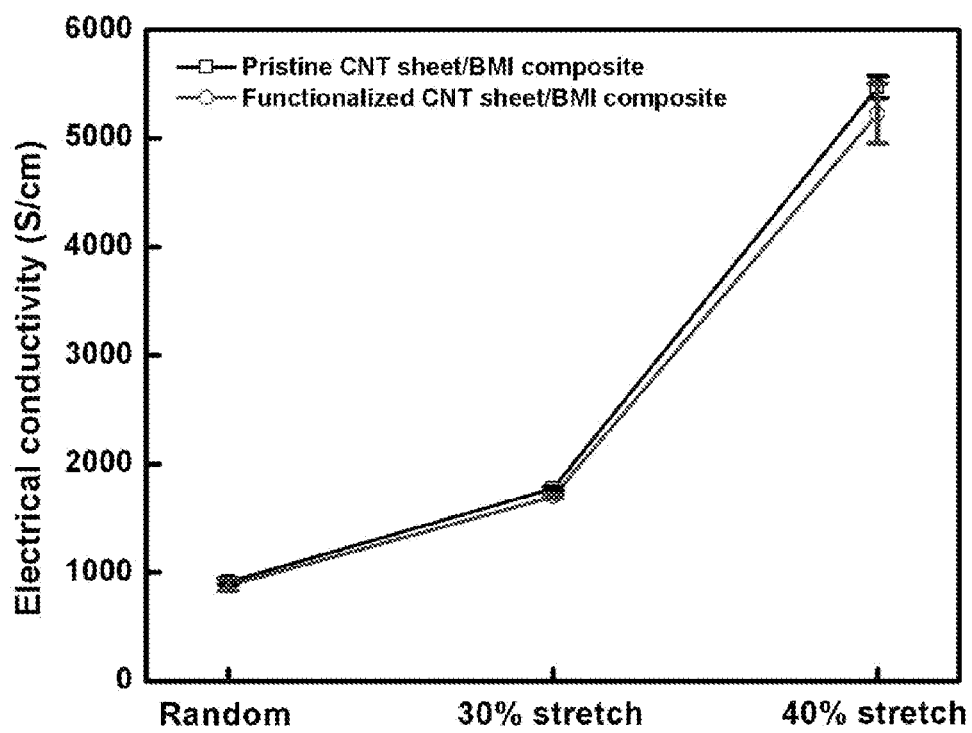
FIG. 10C depicts comparisons of electrical conductivity measurements parallel to the CNT alignment direction in the resultant composites.

Because of the damage caused to the CNT structure, chemical functionalization of CNTs may degrade electrical conductivity. In this embodiment, the degree of functionalization was tailored to 4%, to limit electrical conductivity degradation. FIG. 10C shows the comparison of electrical conductivities of CNT sheet/BMI composites with and without functionalization. Table 2 shows the electrical conductivity of the samples. The electrical conductivities of the functionalized CNT composites only show a small reduction, less than 5%, due to the lower degree of functionalization.

TABLE 2

Comparison of electrical conductivities of CNT sheets/BMI composites with and without functionalization.

| Specimen | Electrical conductivity (S/cm) |
|---|---|
| Pristine random CNT sheet/BMI composite | 915 |
| Functionalized random CNT sheet/BMI composite | 880 |
| Pristine 30% stretch CNT sheet/BMI composite | 1800 |
| Functionalized 30% stretch CNT sheet/BMI composite | 1699 |
| Pristine 40% stretch CNT sheet/BMI composite | 5500 |
| Functionalized 40% stretch CNT sheet/BMI composite | 5226 |

Figure 11:
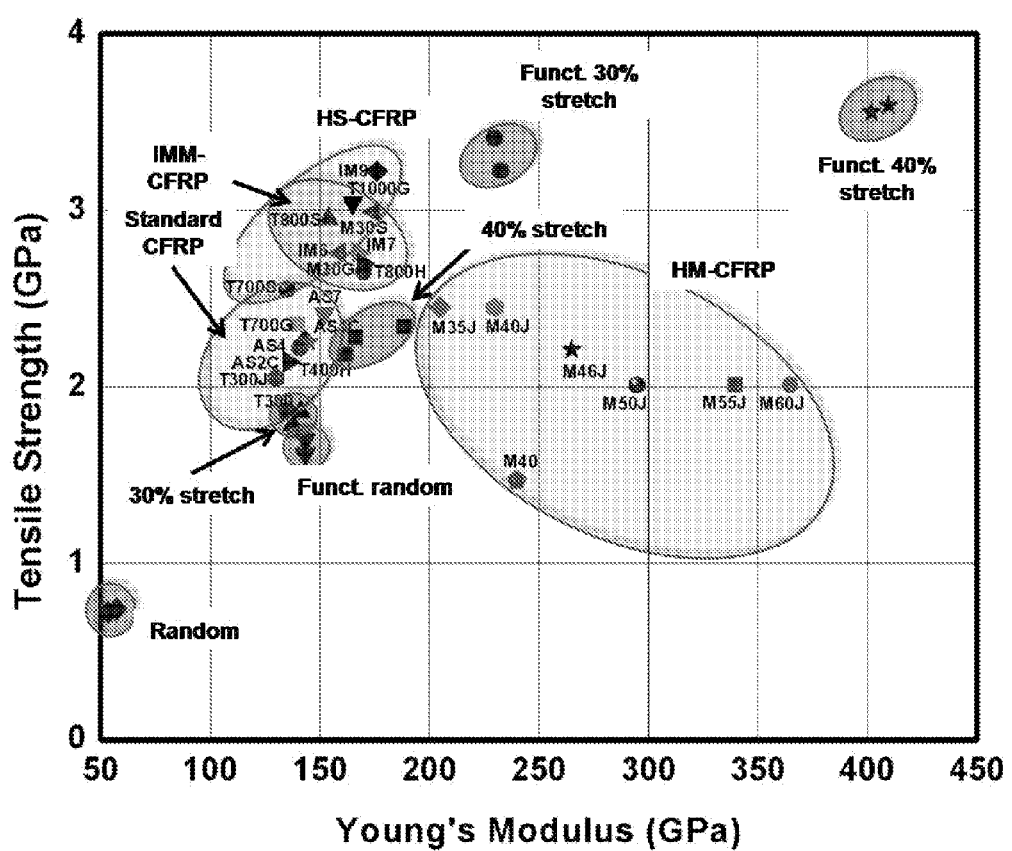
FIG. 11 depicts tensile strength and modulus comparison of the CNT sheets/BMI composites with unidirectional CFRP composites with 60% fiber or CNT volume fraction, and typical metal materials for structural applications, showing exceptional integration of high strength, modulus and large failure strain beyond current CFRP systems. IMM-CFRP: immediate modulus CFRP, HS-CFRP: high strength CFRP, HM-CFRP: high modulus CFRP.

To compare with the state-of-the-art aerospace-grade unidirectional carbon fiber composites for structural applications, the mechanical properties of the resultant CNT sheet/BMI composites were normalized to 60 vol % nanotube volume contents. FIG. 11 illustrates the results. The results illustrate that the degree of alignment CNT effects the mechanical properties and increasing the alignment improves mechanical properties of resultant CNT sheet/BMI composites. The mechanical properties of pristine 40% stretch alignment CNT sheet/BMI composites reached the standard UD carbon fiber reinforced composites, such as AS4 and IM7 carbon fiber composites.

After functionalization, the mechanical properties of functionalized 40% stretch alignment CNT sheet/BMI composites were further improved. The Young's modulus exceeded that of the best high-modulus carbon fiber composites such as M60J epoxy composite, and the tensile strength was 10-20% higher than the best high-strength carbon fiber composites, such as T1000G carbon fiber composites.

In this embodiment, we successfully combined the tailored degree of the functionalization and alignment enhancement to achieve record-high performance for the CNT sheet reinforced epoxy and BMI composites. For the first time, the mechanical properties of CNT/BMI composites exceeded the state-of-the-art high-strength and high-modulus unidirectional carbon fiber composites for structural applications. Furthermore, the effect of CNT functionalization on $T_g$ and electrical conductivity was limited by employing a low degree of functionalization.

We claim:

1. A method for making a composite material comprising:
functionalizing a sheet of carbon nanotubes to produce a sheet of functionalized carbon nanotubes having a degree of functionalization between about 1% to about 10%;
aligning the carbon nanotubes; and, thereafter
impregnating the sheet of functionalized and aligned carbon nanotubes with a matrix material and allowing the sheet of functionalized and aligned carbon nanotubes to bond with the matrix material.

2. The method of claim 1, wherein the step aligning the carbon nanotubes is performed before functionalizing the sheet of carbon nanotubes.

3. The method of claim 1, further comprising contacting the sheet of functionalized and aligned carbon nanotubes with a curing agent.

4. The method of claim 3, wherein the curing agent comprises at least two chemical features selected from the group consisting of an amine, a hydroxyl group, and a double bond.

5. The method of claim 3, wherein the curing agent comprises DETDA.

6. The method of claim 3, wherein the curing agent comprises 2-allyl-4-t-butylphenol.

7. The method of claim 1, wherein the matrix material comprises an epoxide, bismaleimide (BMI), polyimide, canatye, thermoplastic, polyether-ether-ketone (PEEK), polyphenylene sulfide (PPS), polysulfone (PSF), self-reinforcing polymer, polyethersulfone (PES), polycarbonate, or any combination thereof.

8. The method of claim 1, wherein the matrix material comprises bis(2-(oxiran-2-ylmethoxy)phenyl)methane.

9. The method of claim 1, wherein the sheet of carbon nanotubes is functionalized by contacting the sheet of carbon nanotubes with a peroxyacid.

10. The method of claim 9, wherein the peroxyacid is m-CPBA.

11. The method of claim 1, wherein in the step of aligning the carbon nanotubes, the carbon nanotubes are aligned to an alignment of about 60% or more.

12. The method of claim 11, wherein in the step of aligning the carbon nanotubes, the carbon nanotubes are aligned to an alignment of about 80% or more.

13. The method of claim 1, wherein the carbon nanotubes are aligned by stretching the sheet of carbon nanotubes.

14. The method of claim 1, wherein the degree of functionalization is from about 1% to about 5%.

15. The method of claim 14, wherein the degree of functionalization is about 4%.

* * * * *